(12) United States Patent
Nakai

(10) Patent No.: US 8,009,355 B2
(45) Date of Patent: Aug. 30, 2011

(54) OPTICAL ELEMENT HAVING PERIODIC STRUCTURE AND OPTICAL APPARATUS USING THE SAME

(75) Inventor: Takehiko Nakai, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 818 days.

(21) Appl. No.: 11/950,827

(22) Filed: Dec. 5, 2007

(65) Prior Publication Data

US 2008/0130110 A1 Jun. 5, 2008

(30) Foreign Application Priority Data

Dec. 5, 2006 (JP) ................. 2006-328865

(51) Int. Cl.
*G02B 5/30* (2006.01)
(52) U.S. Cl. .......... 359/485.05; 359/489.06; 359/489.07
(58) Field of Classification Search .................. 359/486, 359/572
See application file for complete search history.

(56) References Cited

U.S. PATENT DOCUMENTS

| | | | | |
|---|---|---|---|---|
| 4,751,509 A | * | 6/1988 | Kubota et al. ............ | 349/201 |
| 6,600,603 B1 | * | 7/2003 | Sambles ................... | 359/576 |
| 7,064,899 B2 | * | 6/2006 | Te Kolste et al. ......... | 359/569 |
| 2005/0141090 A1 | * | 6/2005 | Huang et al. ............. | 359/486 |

FOREIGN PATENT DOCUMENTS

| | | |
|---|---|---|
| JP | 2003-090916 | 3/2003 |
| JP | 2003-207636 | 7/2003 |
| JP | 2004-139001 | 5/2004 |
| JP | 2005-099099 | 4/2005 |
| JP | 2005-316393 | 11/2005 |
| JP | 2006-121719 | 5/2006 |
| JP | 2006-124827 | 5/2006 |

OTHER PUBLICATIONS

M. Born et al., Principles of Optics, 6th Edition, 1980, pp. 705-708, Pargamon Press.
H. Kikuta et al, Achromatic quarter-wave plates using the dispersion of form birefringence, Applied Optics., Mar. 1, 1997, pp. 1566-1572, vol. 36, No. 7, Optical Society of America.

* cited by examiner

*Primary Examiner* — Lee Fineman
(74) *Attorney, Agent, or Firm* — Rossi, Kimms & McDowell LLP

(57) ABSTRACT

An optical element includes a first periodic structure portion being formed on a base portion and having a one-dimensional periodic structure in which a first medium and a second medium with a smaller refractive index than that of the first medium are alternately disposed in a first direction, and a second periodic structure portion being formed on the first periodic structure portion and having a periodic structure in which a third medium and a fourth medium with a smaller refractive index than that of the third medium are alternately disposed in the first direction. At an interface between the first and second periodic structure portions, a ratio of the first medium in the first periodic structure portion and a ratio of the third medium in the second periodic structure portion are different from each other. The element has a good form birefringence effect and a high reflection-suppressing effect.

10 Claims, 22 Drawing Sheets

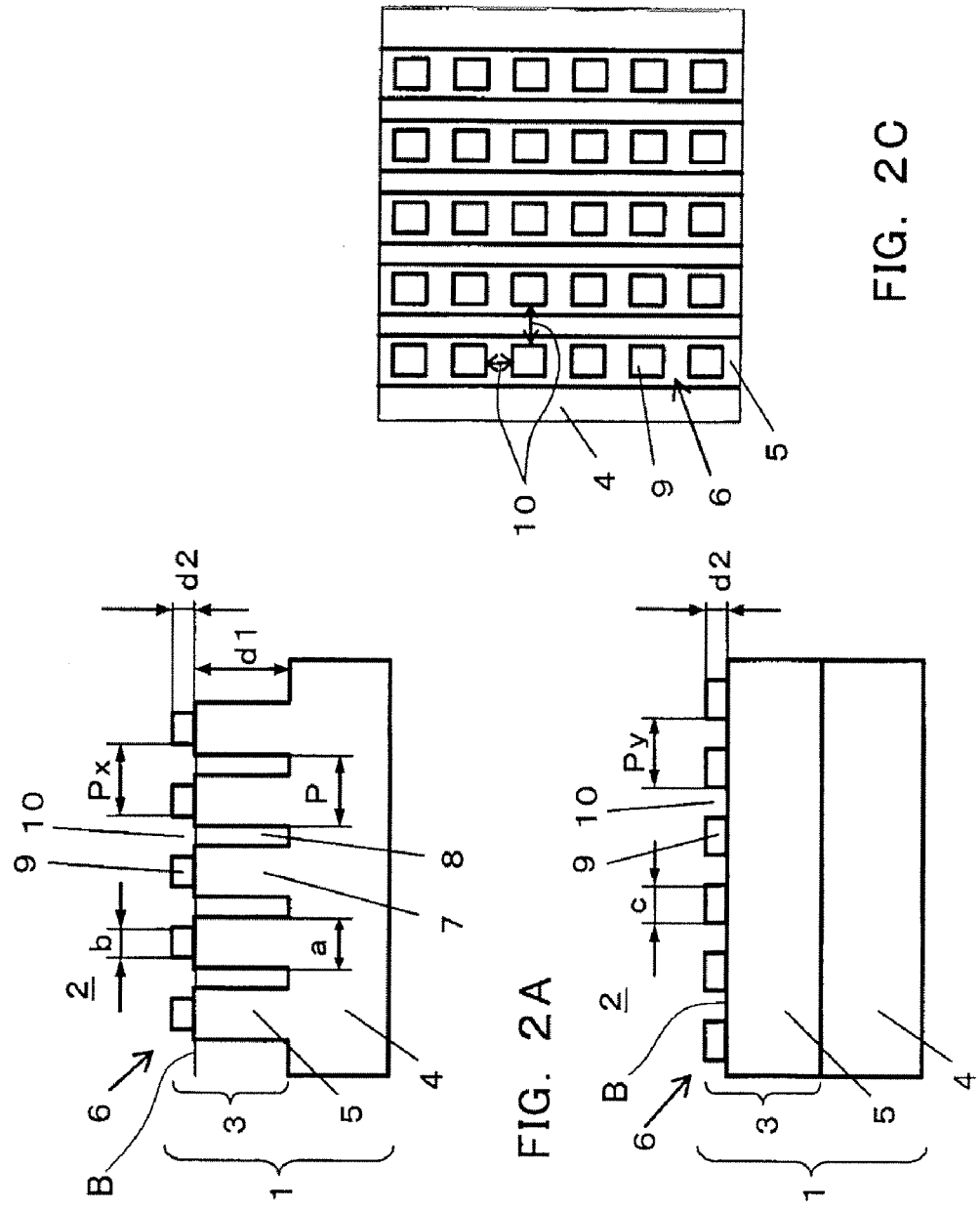

| FOR B | MATERIAL | PERIOD | GRATING WIDTH | GRATING HEIGHT |
|---|---|---|---|---|
| s1 | Air | | | |
| s2 | SiO2 | Px=250 | 115 | 100 |
| | | Py=250 | 187.5 | |
| s3 | SiO2 | P=250 | 187.5 | 1820 |
| s4 (BASE PORTION) | SiO2 | | | |

FIG. 3A  (UNIT: nm)

| FOR G | MATERIAL | PERIOD | GRATING WIDTH | GRATING HEIGHT |
|---|---|---|---|---|
| s1 | Air | | | |
| s2 | SiO2 | Px=300 | 126 | 115 |
| | | Py=300 | 231 | |
| s3 | SiO2 | P=300 | 210 | 1900 |
| s4 (BASE PORTION) | SiO2 | | | |

FIG. 3B  (UNIT: nm)

| FOR G | MATERIAL | PERIOD | GRATING WIDTH | GRATING HEIGHT |
|---|---|---|---|---|
| s1 | Air | | | |
| s2 | SiO2 | Px=360 | 165.6 | 130 |
| | | Py=360 | 252 | |
| s3 | SiO2 | P=360 | 252 | 2230 |
| s4 (BASE PORTION) | SiO2 | | | |

FIG. 3C  (UNIT: nm)

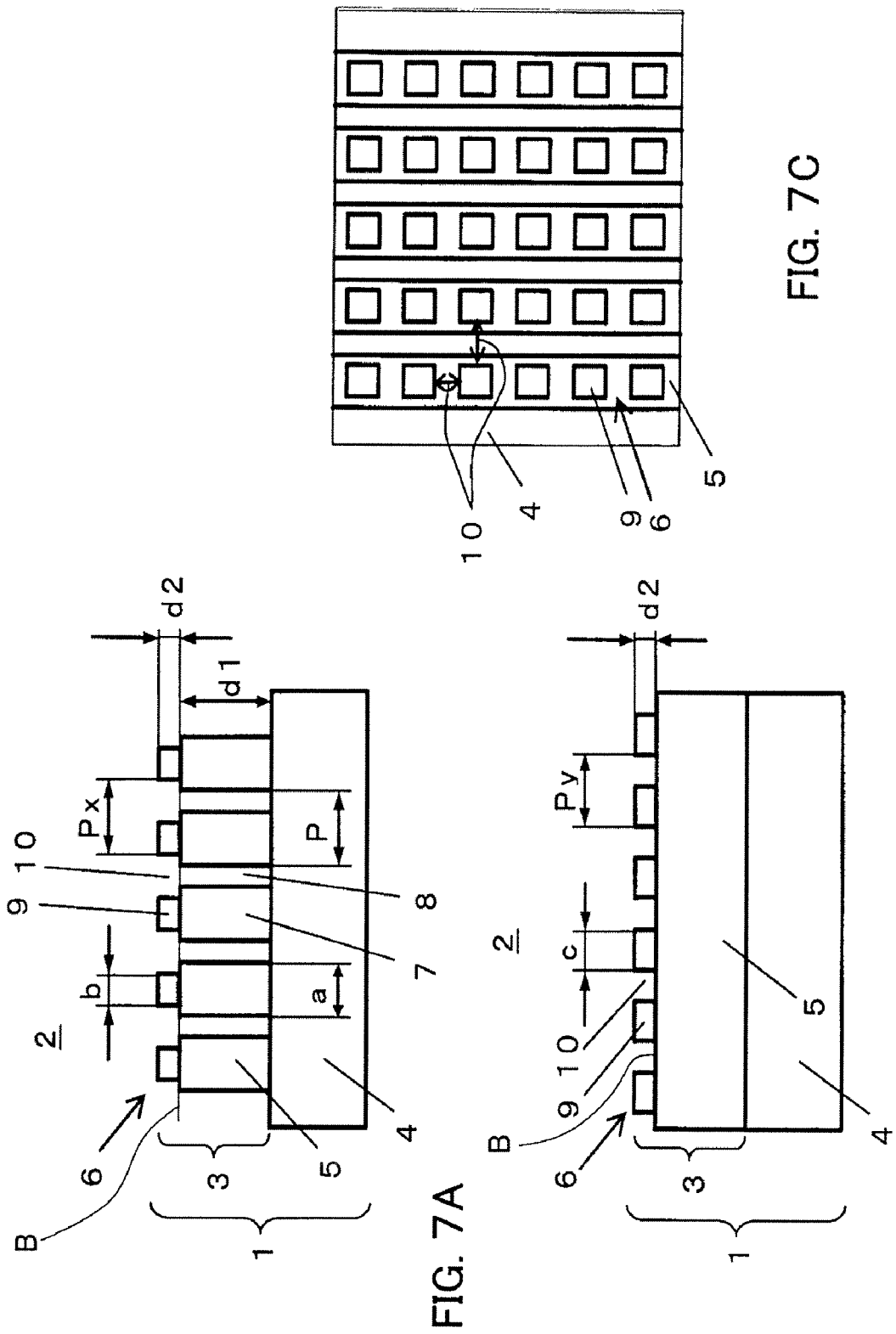

| FOR B | MATERIAL | PERIOD | GRATING WIDTH | GRATING HEIGHT |
|---|---|---|---|---|
| s1 | Air | | | |
| s2 | $Al_2O_3$ | Px=250 | 102.5 | 102 |
| | | Py=250 | 175 | |
| s3 | $Al_2O_3$ | P=250 | 162.5 | 870 |
| s4 (BASE PORTION) | GLASS (n=1.52) | | | |

FIG. 8A (UNIT: nm)

| FOR G | MATERIAL | PERIOD | GRATING WIDTH | GRATING HEIGHT |
|---|---|---|---|---|
| s1 | Air | | | |
| s2 | $Al_2O_3$ | Px=300 | 114 | 110 |
| | | Py=300 | 219 | |
| s3 | $Al_2O_3$ | P=300 | 183 | 940 |
| s4 (BASE PORTION) | GLASS (n=1.52) | | | |

FIG. 8B (UNIT: nm)

| FOR R | MATERIAL | PERIOD | GRATING WIDTH | GRATING HEIGHT |
|---|---|---|---|---|
| s1 | Air | | | |
| s2 | $Al_2O_3$ | Px=360 | 144 | 127 |
| | | Py=360 | 252 | |
| s3 | $Al_2O_3$ | P=360 | 219.6 | 1070 |
| s4 (BASE PORTION) | GLASS (n=1.52) | | | |

FIG. 8C (UNIT: nm)

| FOR B | MATERIAL | PERIOD | GRATING WIDTH | GRATING HEIGHT |
|---|---|---|---|---|
| s1 | Air | | | |
| s2 | $Al_2O_3$ | Px=250 | 125 | 95 |
| | | Py=250 | 172.5 | |
| s3 | $Al_2O_3$ | P=250 | 192.5 | 1305 |
| s4 (BASE PORTION) | GLASS (n=1.52) | | | |

FIG. 11A (UNIT: nm)

| FOR G | MATERIAL | PERIOD | GRATING WIDTH | GRATING HEIGHT |
|---|---|---|---|---|
| s1 | Air | | | |
| s2 | $Al_2O_3$ | Px=300 | 153 | 110 |
| | | Py=300 | 204 | |
| s3 | $Al_2O_3$ | P=300 | 225 | 1470 |
| s4 (BASE PORTION) | GLASS (n=1.52) | | | |

FIG. 11B (UNIT: nm)

| FOR R | MATERIAL | PERIOD | GRATING WIDTH | GRATING HEIGHT |
|---|---|---|---|---|
| s1 | Air | | | |
| s2 | $Al_2O_3$ | Px=360 | 180 | 125 |
| | | Py=360 | 230.4 | |
| s3 | $Al_2O_3$ | P=360 | 270 | 1800 |
| s4 (BASE PORTION) | GLASS (n=1.52) | | | |

FIG. 11C (UNIT: nm)

| FOR B | MATERIAL | PERIOD | GRATING WIDTH | GRATING HEIGHT |
|---|---|---|---|---|
| s1 | Air | | | |
| s2 | Al$_2$O$_3$ | Px=250 | 102.5 | 100 |
| | | Py=250 | 175 | |
| s3 | Al$_2$O$_3$ | P=250 | 162.5 | 860 |
| s5 | SiO$_3$ | | | THICKNESS 80 |
| s4 (BASE PORTION) | GLASS (n=1.52) | | | |

FIG. 16A  (UNIT: nm)

| FOR G | MATERIAL | PERIOD | GRATING WIDTH | GRATING HEIGHT |
|---|---|---|---|---|
| s1 | Air | | | |
| s2 | Al$_2$O$_3$ | Px=300 | 114 | 110 |
| | | Py=300 | 219 | |
| s3 | Al$_2$O$_3$ | P=300 | 183 | 940 |
| s5 | SiO$_3$ | | | THICKNESS 95 |
| s4 (BASE PORTION) | GLASS (n=1.52) | | | |

FIG. 16B  (UNIT: nm)

| FOR R | MATERIAL | PERIOD | GRATING WIDTH | GRATING HEIGHT |
|---|---|---|---|---|
| s1 | Air | | | |
| s2 | Al$_2$O$_3$ | Px=360 | 144 | 127 |
| | | Py=360 | 252 | |
| s3 | Al$_2$O$_3$ | P=360 | 219.6 | 1075 |
| s5 | SiO$_2$ | | | THICKNESS 100 |
| s4 (BASE PORTION) | GLASS (n=1.52) | | | |

FIG. 16C  (UNIT: nm)

OPTICAL ELEMENT HAVING PERIODIC STRUCTURE AND OPTICAL APPARATUS USING THE SAME

BACKGROUND OF THE INVENTION

The present invention relates to an optical element having a form birefringence effect generated by a periodic structure having a smaller period than that of a use wavelength (wavelength of incident light), moreover, to an optical apparatus such as an image projection apparatus using the optical element.

An optical element having a so-called "form birefringence effect" generated by a minute periodic structure having a smaller period than that of a use wavelength and being formed on a base member has been proposed in Born & Wolf "Principles of Optics" pp. 705-708. The optical element having the form birefringence effect is often used as a phase plate such as a quarter-wave plate and a half-wave plate (see Japanese Patent Laid-Open Nos. 2003-90916 and 2003-207636).

A phase plate disclosed in Japanese Patent Laid-Open Nos. 2003-90916 and 2003-207636 includes a one-dimensional grating portion having a specific period on the base member.

Since the period of the one-dimensional grating portion is smaller than that of the use wavelength, the one-dimensional grating portion functions as a medium having birefringence without generating diffracted light. When the product of a refractive index difference generated by the form birefringence effect and the height of the one-dimensional grating portion is a half of the use wavelength or a quarter thereof, the one-dimensional grating portion functions as a phase plate.

The one-dimensional grating portion disclosed in Japanese Patent Laid-Open No. 2003-90916 is constituted by two types of media different in wavelength dispersion of refractive index. The phase plate disclosed in Japanese Patent Laid-Open No. 2003-207636 employs air as one of the two types of media.

Such phase plates are used for an image projection apparatus such as a projector. More specifically, for example, specified color light separated from white light emitted from a light source is introduced as linearly-polarized light (e.g., S-polarized light) having a specified polarization direction by a polarization beam splitter. The light reflected by or transmitted through the polarization beam splitter finally enters a quarter-wave plate The quarter-wave plate converts the entered linearly-polarized light into circularly-polarized light. The circularly-polarized light is then introduced to a reflective-liquid crystal panel. Furthermore, the quarter-wave plate converts the light reflected and image-modulated by the reflective-liquid crystal panel into P-polarized light. The P-polarized light is transmitted through or reflected by the polarization beam splitter to be projected on a screen by a projection lens.

As described above, in the image projection apparatus, the quarter-wave plate gives a significant optical effect to the light projected on the screen. Thus, the quarter-wave plate requires a high transmittance characteristic (low reflectance characteristic) as well as its own functions. When the reflective index of the quarter-wave plate is not low enough, reflections of light between the quarter-wave plate and the reflective-liquid crystal panel are repeated, which forms a ghost image. The ghost image deteriorates the contrast of a projected image. On the other hand, when the transmittance characteristic of the quarter-wave plate is low, the projected image becomes dark.

Japanese Patent Laid-Open Nos. 2003-90916 and 2003-207636, however, do not disclose a transmittance characteristic of the phase plate.

In contrast, phase plates having an improved transmittance characteristic has been disclosed in Japanese Patent Laid-Open No. 2004-139001 and in H. Kikuta et al "Apply. Opt. Vol. 36, No. 7" pp. 1566-1572 (1997).

A one-dimensional grating portion disclosed in Japanese Patent Laid-Open No. 2004-139001 has a two-layer structure formed of materials different in refractive index and dispersion characteristic. Thereby, the phase difference characteristic of the one-dimensional grating portion is improved. Furthermore, materials of the grating portion and the base member are selected so as to reduce a refractive index difference at an interface between the one-dimensional grating portion and the base member to lower the reflectance of the phase plate.

On the other hand, in a phase plate disclosed in H. kikuta et al "Apply. Opt. Vol. 36, No. 7" pp. 1566-1572 (1997), a one-dimensional grating portion is sandwiched by layers of a specified material, thereby reducing reflection generated at interfaces between the one-dimensional grating portion and the specified material layers.

In a phase plate disclosed in Japanese Patent Laid-Open No. 2004-139001, the phase plate has a high transmittance characteristic equal to or more than 95%. However, since only limited materials are available to form the one-dimensional grating portion, it is difficult to further lower its reflectance.

In the phase plate disclosed in H. Kikuta et al "Apply. Opt. Vol. 36, No. 7" pp. 1566-1572 (1997), the reflection generated at the interfaces of the grating portion is reduced. However, an anti-reflection coating on the specified material layer is needed to reduce reflection generated at an interface between the specified material layer and air. Although no method for manufacturing the phase plate is proposed in H. Kikuta et al "Apply. Opt. Vol. 36, No. 7" pp. 1566-1572 (1997), it is expected to be very difficult.

BRIEF SUMMARY OF THE INVENTION

The present invention provides an optical element having a good form birefringence effect and a higher transmittance characteristic (reflection-suppressing effect or anti-reflection effect) than that of conventional ones.

According to an aspect, the present invention provides an optical element that includes a base portion having translucency, a first periodic structure portion being formed on the base portion and having a one-dimensional periodic structure in which a first medium and a second medium with a smaller refractive index than that of the first medium are alternately disposed in a first direction at a smaller period than that of a wavelength of incident light, and a second periodic structure portion being formed on the first periodic structure portion on an opposite side to the base portion and having a periodic structure in which a third medium and a fourth medium with a smaller refractive index than that of the third medium are alternately disposed in the first direction at a smaller period than the wavelength of the incident light. At an interface between the first periodic structure portion and the second periodic structure portion, a ratio of the first medium in the first periodic structure portion in the first direction and a ratio of the third medium in the second periodic structure portion in the first direction are different from each other.

According to another aspect, the present invention provides an optical apparatus that includes the above optical element. The optical apparatus forms an image using light from the optical element.

According to still another aspect, the present invention provides an image projection apparatus that includes a light-modulating element modulating light from a light source, a projection optical system projecting light modulated by the light-modulating element, and the above optical element as a phase plate through which the light entering into and emerging from the light-modulating element passes.

Other aspects of the present invention will become apparent from the following description and the attached drawings.

BRIEF DESCRIPTION OF THE DRAWINGS

FIG. 2A is an x-z cross sectional view of the phase plate shown in FIG. 1.

FIG. 2B is a y-z cross sectional view of the phase plate shown in FIG. 1.

FIG. 2C is a top view of the phase plate shown in FIG. 1.

FIG. 3A is a table showing design parameters of a phase plate (quarter-wave plate for blue) of a first embodiment (Embodiment of the present invention).

FIG. 3B is a table showing design parameters of a phase plate (quarter-wave plate for green) of Embodiment 1.

FIG. 3C is a table showing design parameters of a phase plate (quarter-wave plate for red) of Embodiment 1.

FIG. 7A is an x-y cross sectional view of the phase plate shown in FIG. 6.

FIG. 7B is a y-z cross sectional view of the phase plate shown in FIG. 6.

FIG. 7C is a top view of the phase plate shown in FIG. 6.

FIG. 8A is a table showing design parameters of a phase plate (quarter-wave plate for blue) of Embodiment 2.

FIG. 8B is a table showing design parameters of a phase plate (quarter-wave plate for green) of Embodiment 2.

FIG. 8C is a table showing design parameters of a phase plate (quarter-wave plate for red) of Embodiment 2.

FIG. 11A is a table showing design parameters of a phase plate (quarter-wave plate for blue) that is a third embodiment (Embodiment 3) of the present invention.

FIG. 11B is a table showing a design parameter of a phase plate (quarter-wave plate for G) that is Embodiment 3.

FIG. 11C is a table showing design parameters of a phase plate (quarter-wave plate for red) of Embodiment 3.

FIG. 16A is a table showing design parameters of a phase plate (quarter-wave plate for blue) of Embodiment 4.

FIG. 16B is a table showing design parameters of a phase plate (quarter-wave plate for green) of Embodiment 4.

FIG. 16C is a table showing design parameters of a phase plate (quarter-wave plate for red) of Embodiment 4.

DETAILED DESCRIPTION OF THE PREFERRED EMBODIMENTS

Exemplary embodiments of the present invention will hereinafter be described with reference to the accompanying drawings.

Figure 1:
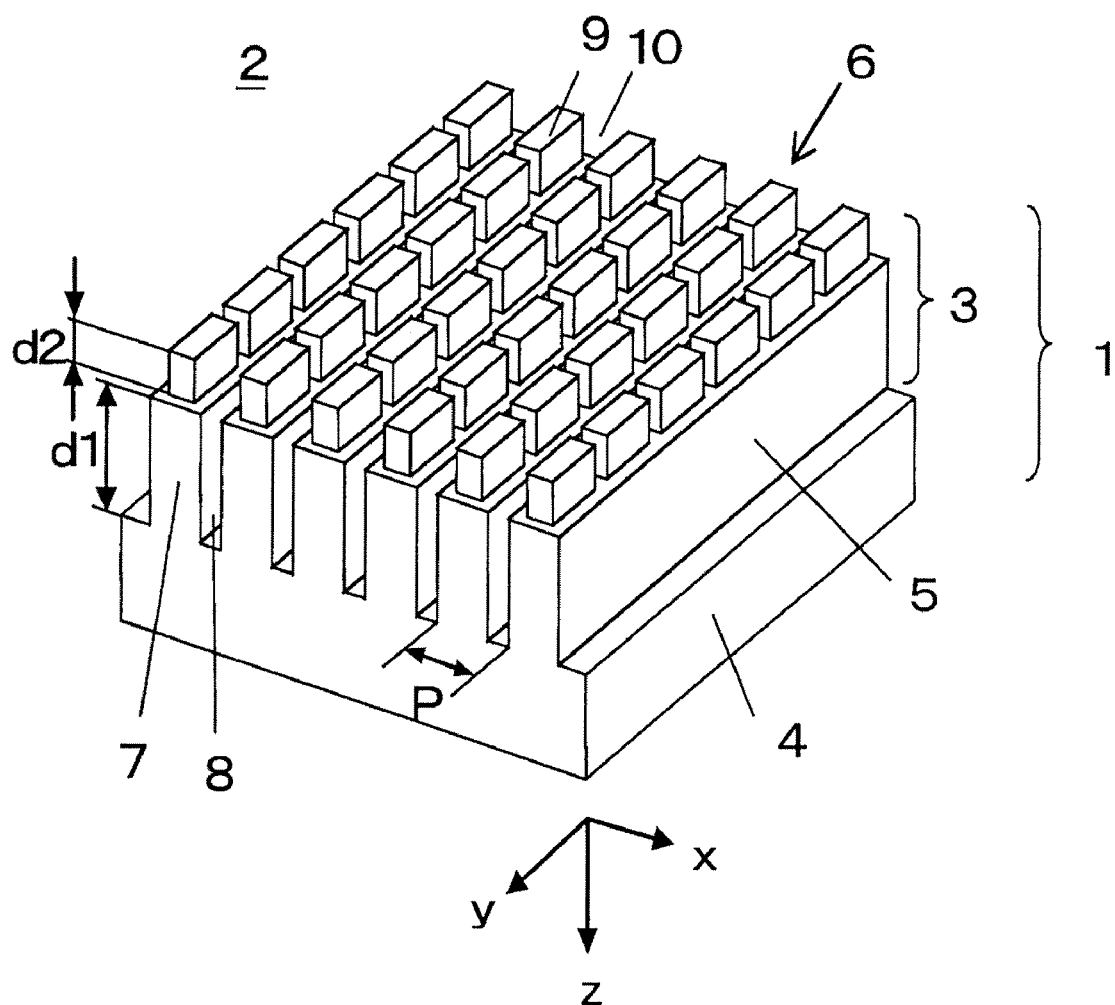
FIG. 1 is a perspective view of the basic structure common to phase plates that are embodiments of the present invention.

Prior to specific descriptions of embodiments, a phase plate as an optical element that is an embodiment of the present invention is described referring to FIGS. 1 and 2A to 2C. FIG. 1 is a perspective view of the phase plate, and FIGS. 2A and 2B are an x-y cross sectional view and a y-z cross sectional view, respectively. FIG. 2C is a top view of the phase plate.

A phase plate 1 includes a base portion 4 having translucency (having a characteristic of transmitting visible light), and a periodic structure portion (subwavelength structure portion) 3 being formed on the base portion 4 and having a smaller period than the wavelength of incident light (also referred to as a use wavelength or a design wavelength).

The wavelength of the incident light (use wavelength or design wavelength) herein is a wavelength near the visible wavelength. In other words, the wavelength of the incident light is a wavelength from 400 nm to 700 nm. It is preferable that the period of the above-described periodic structure portion (subwavelength structure portion) is shorter than the wavelength of the incident light (visible wavelength), particularly shorter than half of the visible wavelength (200 nm).

The periodic structure portion 3 includes a first periodic structure portion 5 formed in such a manner to include a one-dimensional structure (also referred to as a one-dimensional grating) on the base portion 4. Moreover, the periodic structure 3 formed on the base portion 4 includes a second periodic structure portion 6 formed in such a manner to include a two-dimensional structure (also referred to as a two-dimensional grating) on an interface of the first periodic structure 5 opposite to the base portion 4. The first periodic structure portion 5 has a form birefringence effect by its periodic structure having a period in an x direction (first direction), and the form birefringence effect provides a phase difference to incident light. The second periodic structure portion 6 has a reflection-suppressing effect by its two-dimensional periodic structure. The first periodic structure portion 5 is referred to as a phase difference portion and the second periodic structure portion 6 as a reflection-suppressing portion in the following descriptions. Although the reflection-suppressing portion (second periodic structure portion) 6 basically has a two-dimensional grating structure, it may have a one-dimensional grating structure. In this case, the reflection-suppressing effect requires that a width 'a' of a first medium (described later) is different from a width 'b' or 'c' of a second medium (described later) or more preferably the width b is smaller than the width a.

The phase plate 1 is disposed in air and in contact with the air that is an incident-side medium 2. The phase difference portion 5 having a one-dimensional-grating shape with periodicity in the x direction is a one-dimensional grating with a period 'P'. The period P can be obtained from conditions for not causing diffraction of the incident light at the phase difference portion 5. Under the conditions for not causing diffraction of the incident light, the one-dimensional grating provides a birefringence characteristic caused by its structure. Although the incident light may have any wavelength, it preferably has a wavelength in the visible wavelength range. In this case, the period of the periodic structure is preferably equal to or lower than 400 nm, more preferably equal to or lower than 300 nm, and still more preferably equal to or lower than 200 nm.

The phase difference portion 5 as a one-dimensional grating has a structure in which a first medium 7 and a second medium 8 each having a rectangular grating shape are alternately (periodically) disposed in its periodic direction (x direction). The width (length in the periodic direction) of the first medium is defined as 'a', and that of the second medium is P-a.

In the embodiments of the present invention, of the first medium 7 and the second medium 8 each having translucency, a medium having a higher refractive index is defined as the first medium 7, and a medium having a lower refractive index is defined as the second medium 8.

In embodiments, the second medium 8 is air. The second medium 8 may be formed of a material having translucency such as glass and resin.

The grating height of the phase difference portion 5 is defined as d1. A material having a refractive index equal to or smaller than 1.8 is preferable as the material of the first medium 7.

The structure of the reflection-suppressing portion 6 formed on the phase difference portion 5 will be described as follows.

The reflection-suppressing portion 6 reduces reflection occurring at an interface between the phase difference portion 5 and the incident-side medium 2. The reflection-suppressing portion 6 in the embodiments has a two-dimensional-rectangular grating shape that has periods in a direction identical to the periodic direction of the phase difference portion 5 and in a direction orthogonal thereto.

In the reflection-suppressing portion 6, the period in the periodic direction identical to that of the phase difference portion 5 (x direction in the figure) is defined as Px, and the period in the periodic direction orthogonal thereto (y direction in the figure) is defined as Py. The reflection-suppressing portion 6 has a structure in which a third medium 9 and a fourth medium 10 are alternately disposed in the above two periodic directions. Each of the third medium 9 and the fourth medium 10 has translucency.

Although in the embodiments the third medium 9 is formed of the same material as that of the first medium described above, the material of the third medium 9 is not limited thereto. Although the fourth medium in the embodiments is air as well as the second medium described above, the material of the fourth medium 10 is not limited thereto. That is, any material may be used for the third medium 9 and the fourth medium 10.

The third medium 9 has a convex shape of which the widths b and c in the x direction and the y direction, respectively. The fourth medium 10 is air. The grating height of the reflection-suppressing portion 6 is d2.

In the embodiments, a plurality of convex portions (hereinafter simply referred to as a convex portion) formed of the third medium 9 is provided only on the interface between the first medium 7 and the incident-side medium 2, the first medium 7 having a higher refractive index out of the two media 7 and 8 constituting the phase difference portion 5. It is relatively easy to form such a convex portion only on a surface of one medium. The above is the basic structure of the phase plate 1 in the embodiments.

As described above, in the embodiments, the periodic structure in which the first and second periodic structure portions are different from each other means that the periodic structure in which the portions are different in at least one of the following two grating parameters. The first grating parameter relates to the grating period. This grating parameter includes the width, direction and number of the period. The second parameter relates to the grating width. That is, the grating width a of the first medium constituting the first periodic structure portion is different from the grating width b or c of the third medium constituting the second periodic structure portion.

The phase plate 1 in the embodiments will be described from the viewpoint of its optical functions. An effective medium theory (EMT) is employed to describe optical characteristics of a minute periodic structure (having a smaller period than that wavelength of incident light or used light). The EMT is a means for obtaining an apparent refractive index (hereinafter referred to as an effective refractive index) of the structure having the minute periodic structure. How to calculate the effective refractive index of the first periodic structure is described in Born & Wolf "Principles of Optics" p.p. 706-707.

The effective refractive index of the phase difference portion 5 will be described first. In the embodiments, polarized light having a polarization direction orthogonal to the periodic direction of the grating is defined as TE-polarized light, and polarized light orthogonal to the TE-polarized light in an incident surface of the grating is defined as TM-polarized light. The effective refractive indexes of the TE-polarized light and the TM-polarized light are respectively defined as np (TE) and np (TM).

A value referred to as a filling factor FF is defined. The width of one of two materials constituting the grating (the first medium 7 herein) is defined as 'a'. The filling factor FF (hereinafter also written as FFa) indicates a ratio of the material with the width a in a grating period P, which is expressed as:

$$FFa = a/P.$$

The filling factor FF (FFa) is also a ratio of a certain medium (e.g., the first medium, the second medium, the third medium or the fourth medium) to the period of the periodic structure (e.g., the phase difference portion 5 or the reflection-suppressing portion 6).

In the embodiments, the filling factor FF indicates, in the periodic structure, a ratio of the medium having a high refractive index to the period thereof.

In the embodiments, the filling factor FF (FFa) of the phase difference portion (first periodic direction) 5 in the x direction and that of the reflection-suppressing portion 6 (second periodic direction) in that direction at their interface B are different from each other.

In other words, in the x direction in which the phase difference portion 5 and the reflection-suppressing portion 6 respectively have periodicity, the filling factors FF thereof are different from each other. In particular, the filling factor FF of the phase difference portion 5 is larger than that of the reflection-suppressing portion 6, the phase difference portion 5 being closer to the base portion 4 than the reflection-suppressing portion 6.

In addition, it is preferable that the filling factor FF of the reflection-suppressing portion 6 in the y direction be smaller than that of the phase difference portion 5 in the x direction. Further, although it is preferable that the filling factor FF of the reflection-suppressing portion 6 in the x direction be smaller than that of the reflection-suppressing portion 6 in the y direction, these filling factors FF may be approximately equal to each other.

Based on the above filling factor FF (FFa), the effective refractive indexes np(TE) and np(TM) of the polarization directions are expressed as follows:

$$np(TE) = SQRT\{n1^2 FFa + n2^2(1-FFa)\} \quad (1)$$

$$np(TM) = 1/SQRT\{(1/n1^2)FFa + (1/n2^2)(1-FFa)\} \quad (2)$$

where n1 represents a refractive index of one of the two materials constituting the grating, and n2 represents that of the other material. SQRT{ } represents a square root of { }, and FFa represents the filling factor.

A refractive index difference Δn is expressed as:

$$\Delta n = np(TE) - np(TM) \quad (3).$$

When the height of the one-dimensional grating is defined as d1, a phase difference φ given to the incident light by the one-dimensional grating is expressed as:

$$\varphi = 360 \times \Delta n \times d1/\lambda \quad (4).$$

When φ is 180 degrees, the phase plate 1 functions as a half-wave plate. When φ is 90 degrees, the phase plate 1 functions as a quarter-wave plate.

The effective refractive index of the reflection-suppressing portion 6 will be described next. The effective refractive index of a two-dimensional grating can be obtained by repeating calculation of the effective refractive index of the one-dimensional grating two times in two directions orthogonal to each other.

$$nx = SQRT\{n3^2 FFc + n4^2(1-FFc)\} \quad (5)$$

$$ny = 1/SQRT\{(1/n3^2)FFc + (1/n4^2)(1-FFc)\} \quad (6)$$

$$nr(TE) = SQRT\{ny^2 FFb + n2^2(1-FFb)\} \quad (7)$$

$$nr(TM) = 1/SQRT\{(1/nx^2)FFb + (1/n2^2)(1-FFb)\} \quad (8)$$

where n3 represents the refractive index of one of the two materials constituting the grating, and n4 represents that of the other material. FFb and FFc represent the filling factors of the third medium (convex portion) 9 in the x direction and in the y direction, respectively, which are expressed as FFb=b/Px, FFc=c/Py.

It is preferable that the effective refractive index of the reflection-suppressing portion 6 be smaller than that of the phase difference portion 5 and higher than the refractive index of air. Further, it is preferable that, of the media constituting the reflection-suppressing portion 6, one (third medium) with a higher refractive index is provided on, of the media constituting the phase difference portion 5 formed on the base portion 4, one (first medium) with a higher refractive index. Moreover, it is preferable that, in the x direction (first direction), the width of the first medium be larger than that of the third medium. Additionally, a single-layer film (anti-reflection coating or layer having a reflection-suppressing effect) having a general reflection-suppressing effect will be described.

An optimum refractive index nc of the anti-reflection coating disposed on an interface between two media nA and nB is expressed as follows:

$$nc = SQRT(nA \times nB). \quad (9)$$

When a film thickness of the anti-reflection coating is defined as 'd' and the following expression is met:

$$nc \times d = \lambda_0/4 \quad (10),$$

a reflection of light with a wavelength λ0 can be prevented.

Thus, in the embodiments, after determining the grating shape of the phase difference portion 5, the form (shape) of the reflection-suppressing portion 6 may be determined in such a manner that expressions (9) and (10) are satisfied in each polarization direction.

Specifically, the grating shape of the phase difference portion 5 is determined to obtain a desired phase difference characteristic. The determination of the form of the grating enables the calculation of the effective refractive index of the grating in each polarization direction from the expressions (1) and (2). Then, the effective refractive index of the reflection-suppressing portion 6 that satisfies the expression (9) in each polarization direction is determined. When the incident-side medium 2 is air, the effective refractive index of the reflection-suppressing portion 6 can be expressed as follows:

$$nr(TE) = SQRT\{np(TE)\} \quad (11)$$

$$nr(TM) = SQRT\{np(TM)\} \quad (12).$$

The two-dimensional grating shape of the reflection-suppressing portion 6 may be determined using the expressions (5), (6), (7) and (8) so as to satisfy the expressions (11) and (12). However, since the film (layer) thickness d (d2 in the figure) in the expression (10) cannot be actually changed for each polarization direction, d2, nr(TE) and nr(TM) are determined while the final reflection-suppressing performance is confirmed.

Additionally, in the reflection-suppressing portion 6 as well, since nr(TE) and nr(TM) are different from each other, a phase difference is generated. This phase difference is very small compared to that generated in the phase difference portion 5. However, for the ultimate performance of the phase plate 1, the phase difference in the entire phase plate 1 needs to be determined, while the phase difference in the reflection-suppressing portion 6 is taken into account.

As described above, the phase plate 1 in the embodiments basically controls the phase difference characteristic of the phase difference portion 5 and the reflection-suppressing characteristic in the reflection-suppressing portion 6. Since the two major characteristics can be controlled by the grating shapes independent from each other, the two characteristics can be preferably controlled compared to the conventional structure. In order to optimize the reflection-suppressing characteristic, preferably the width a of the first medium 7 constituting the phase difference portion 5 is widened as much as possible. More specifically, it is preferable that FFa is equal to or more than 0.6 and equal to or less than 0.85. That is, it is preferable that a relationship of $0.6 \leq a/P \leq 0.85$ is satisfied.

When FFa is less than 0.6, it may be difficult to accurately position the grating of the phase difference portion 5 and that of the reflection-suppressing portion 6 formed on the phase difference portion 5. Moreover, since reflection has more effects on the interface between the base portion 4 and the phase difference portion 5, the transmittance characteristic of the phase plate 1 as an optical element may be deteriorated. Furthermore, the grating width of the reflection-suppressing portion 6 becomes too narrow, thereby making manufacturing of the reflection-suppressing portion difficult.

On the other hand, when FFa is more than 0.85, it may be difficult to obtain the refractive index difference generated by the form birefringence effect, and then the grating height of the phase difference portion 5 may be extremely high. Thus, manufacturing of the phase difference portion may be difficult. Moreover, a difference between the refractive index of the phase difference portion 5 and that of the incident-side medium 2 may be too large, so that it may be difficult to obtain a preferable reflection-suppressing effect of the reflection suppressing structure in a simple-rectangular-grating shape like those in the embodiments.

As to an example in which the phase plate 1 described above is applied for an image projection apparatus, constituent elements provided in the image projection apparatus will be described referring to FIG. 20.

Figure 20:
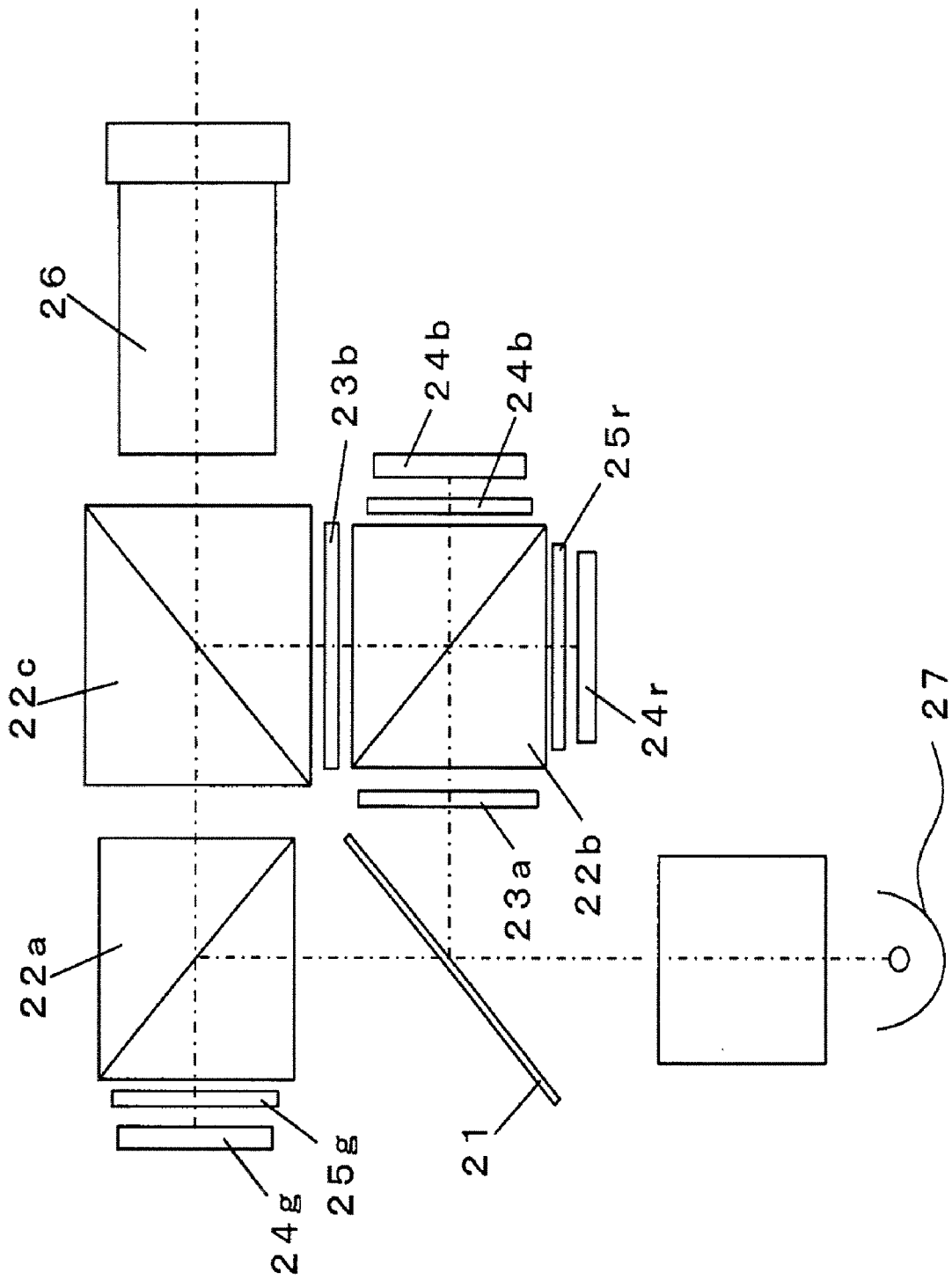
FIG. 20 is a top view showing an image projection apparatus provided with the phase plate of the embodiments.

In FIG. 20, reference numeral 27 denotes a light source lamp, 28 an illumination optical system introducing white light from the light source lamp 27 to a color separating/combining optical system described below.

Reference numeral 21 denotes a dichroic mirror that transmits a green wavelength component (green light) of the white light emitted from the illumination optical system 28, while transmitting other wavelength components (red light and blue light).

Reference numerals 22a, 22b and 22c denote polarization beam splitters each reflecting S-polarized light and transmitting P-polarized light. Reference numerals 23a and 23b denote color-selective wave plates each converting (rotating) the polarization direction of light in a specified wavelength band by 90 degrees. Reference numerals 24r, 24g and 24b denote reflective liquid crystal panels (light-modulation elements) for red, green and blue.

Each of the reflective liquid crystal panels reflects entering light and modulates the light based on an image signal input from an image supplying apparatus (PC, DVD player, television tuner, video deck and the like) (not shown) to form an original image. Reference numerals 25r, 25g and 25b denote quarter-wave plates as phase plates for red, green and blue, each having a polarization conversion effect.

Reference numeral 26 denotes a projection lens, which projects red image light, green image light and blue image light combined by the color separating/combining optical system described above on a screen (not shown). The red image light, green image light and blue image light are emitted from three liquid crystal panels 24r, 24g and 24b.

Referring to the green light transmitted through the dichroic mirror 21 as an example, the polarization conversion effect of the quarter-wave plate 25g will be described. The S-polarized component of the green light transmitted through the dichroic mirror 21 is reflected on a polarization splitting surface of the polarization beam splitter 22a. The S-polarized light is transmitted through the quarter-wave plate 25g to be converted into circularly-polarized light, and then enters into the reflective liquid crystal panel 24g.

The green image light emerging from the reflected liquid crystal panel 24g is transmitted through the quarter-wave plate 25g again to be converted into P-polarized light. The green image light is transmitted through the polarization beam splitters 22a and 22c and then projected on the screen by the projection lens 26.

The quarter-wave plates 25r and 25b have the polarization conversion effect on the other color lights reflected by the dichroic mirror as well as that of the quarter-wave plate 25g for green.

In the image projection apparatus having the above structure, use of a quarter-wave plate (phase plate) having a good phase difference characteristic and a good transmittance characteristic that will be described in the following embodiments can realize an image projection apparatus having a good optical performance for enabling projection of a high contrast image.

The embodiments of the phase plate as an optical element will be more specifically described below. In the embodiments, portions common to those in the basic structure described above are designated with the same reference numerals.

Embodiment 1

Referring to FIG. 1 and FIGS. 3A to 3C, a phase plate that is a design example as a first embodiment (Embodiment 1) of the present invention will be described in detail. In this embodiment, the phase plate is configured as shown in FIG. 1. In other words, the phase plate is constituted by the phase difference portion 5 having a one-dimensional periodic structure formed on the base portion 4 and the reflection-suppressing portion 6 having a two-dimensional periodic structure formed on the phase difference portion 5.

The phase plate of this embodiment is used as a quarter-wave plate for the image projection apparatus described above. This is also applied for the other embodiments described below.

The quarter-wave plate is optimized for a wavelength band (a wavelength band of incident light, that is, a use wavelength band) for each color because it is used for an optical path after color separation. Specifically, the quarter-wave plate for blue is optimized for a wavelength band of 450±50 nm, the quarter-wave plate for green is optimized for a wavelength band of 550±50 nm and the quarter-wave plate for red is optimized for a wavelength band of 600±50 nm.

FIG. 3A shows design parameters of the quarter-wave plate for blue, FIG. 3B shows those for green, and FIG. 3C shows those for red.

In these figures, in column s2, the material, the period, the grating width and the grating height of the convex portion of the reflection-suppressing portion 6 are shown. In column s3, the material, the period, the grating width and the grating height of the first medium 7 of the phase difference portion 5 are shown. In column s1, the material of the incident-side medium 2, the second medium 8 and the fourth medium 10 is shown. In column s4, the material of the base portion 4 is shown. These are also applied to design parameters in the other embodiments described below.

In this embodiment, air (refractive index n=1.0) is used for the second medium 8 constituting the phase difference portion 5 and the fourth medium 10 constituting the reflection-suppressing portion 6. The periodic structure portion 3 and the base portion 4 are constituted by the same medium (SiO2: refractive index n=1.47).

The grating period is determined so that diffracted light is not generated in the wavelength band of each color. The grating period of the quarter-wave plate for blue is set to 250 nm, that for blue is set to 300 nm, and that for red is set to 360 nm. In the quarter-wave plate for each color, this embodiment employs the period P of the phase difference portion 5 same as the periods Px and Py of the reflection-suppressing portion 6. Other design parameters are shown in FIGS. 3A to 3C.

Figure 4:
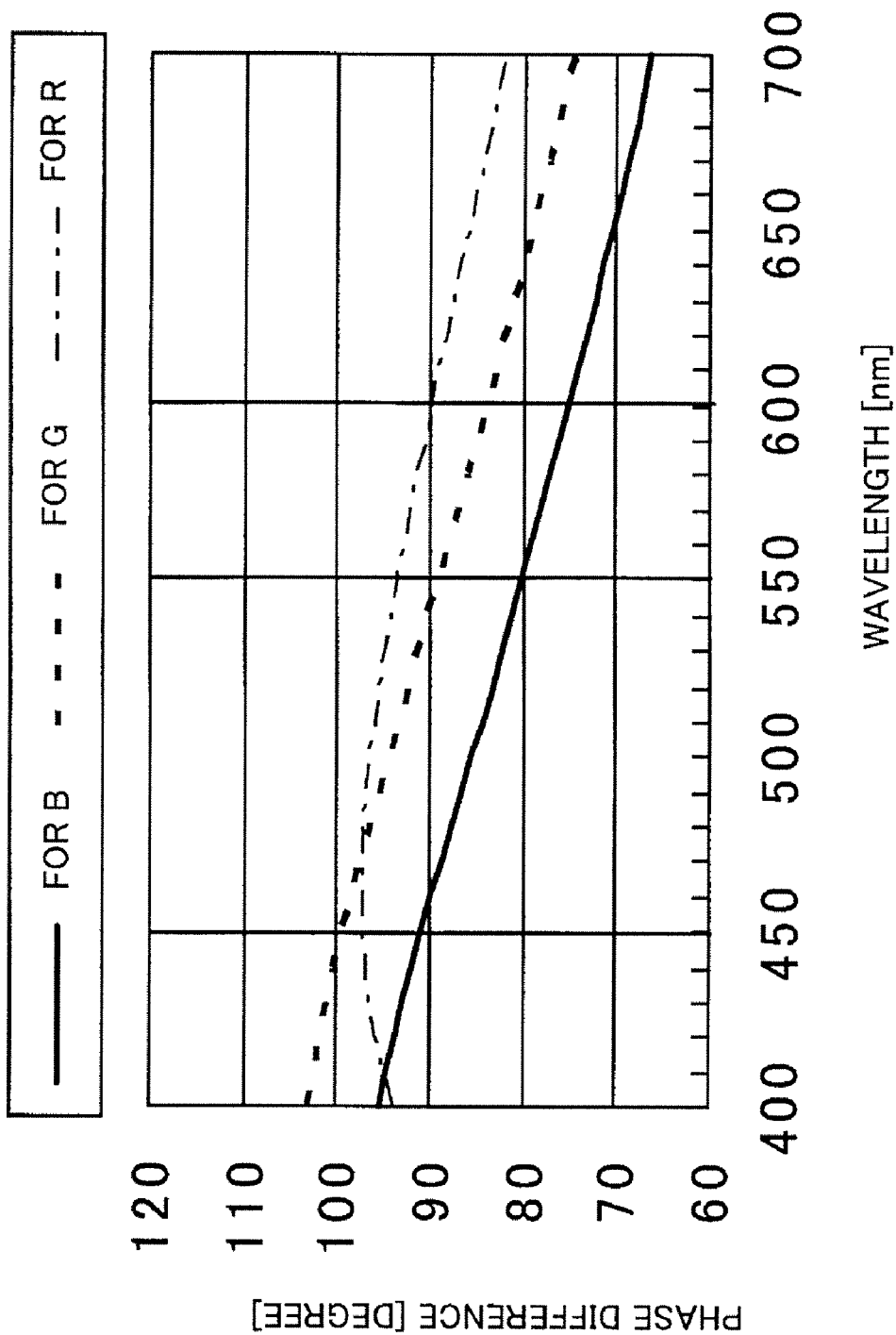
FIG. 4 is a graph showing a phase difference characteristic of the phase plate (quarter-wave plate for blue) of Embodiment 1.
Figure 21:
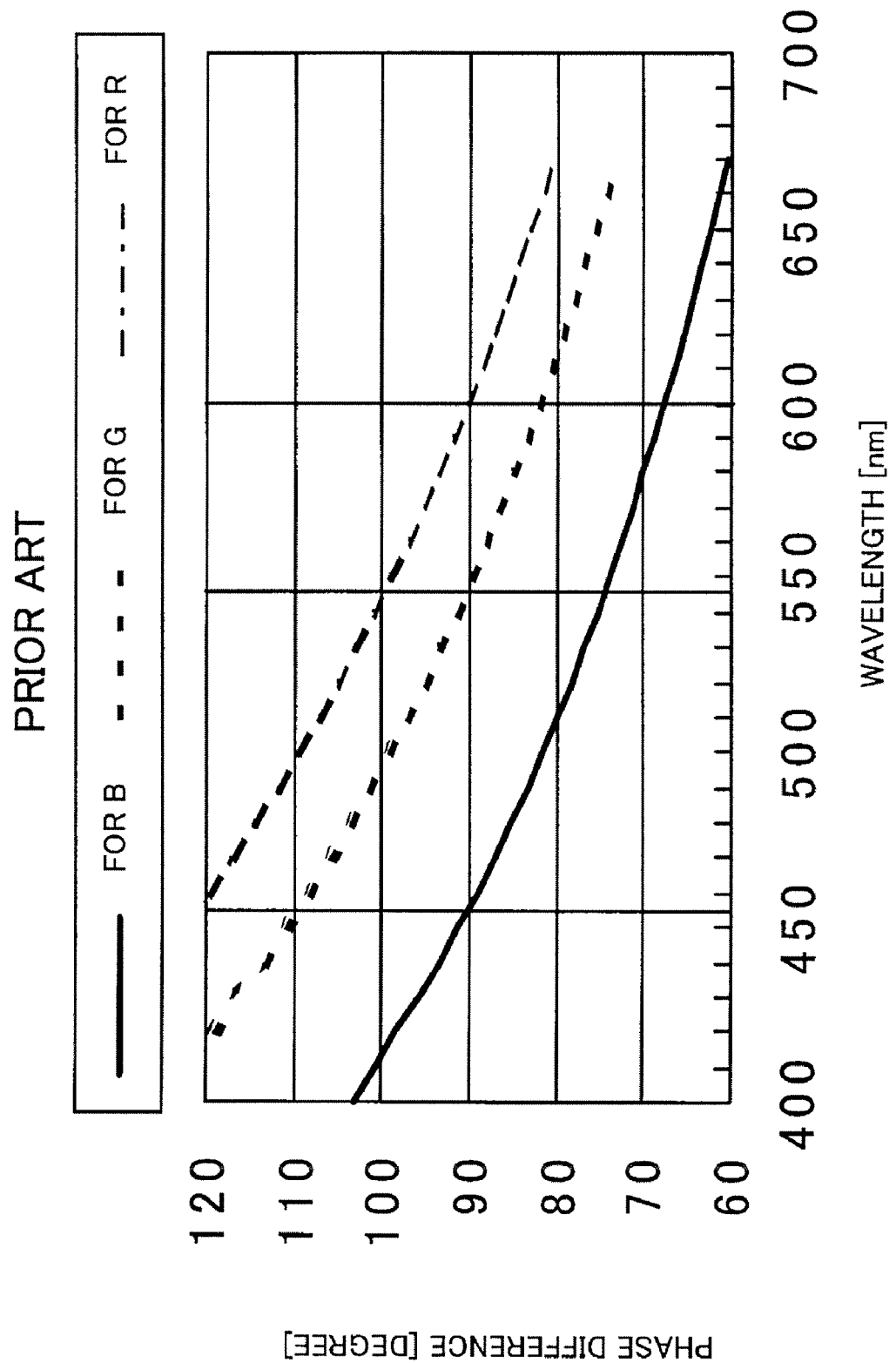
FIG. 21 is a graph showing a phase difference characteristic of a conventional quarter-wave plate.

FIG. 4 shows a phase difference characteristic of the quarter-wave plate of this embodiment. FIG. 21 shows a phase difference characteristic of a conventional and general quarter-wave plate for comparison. In these figures, the lateral axis indicates wavelength, the vertical axis indicates phase difference. The solid line indicates phase difference of the quarter-wave plate for blue, the dashed line indicates that for green and the dashed-dotted line indicates that for red.

Comparing these figures shows that the quarter-wave plate for each color of this embodiment has a phase difference characteristic equal to or better than that of the conventional quarter-wave plate for each color.

Figure 5A:
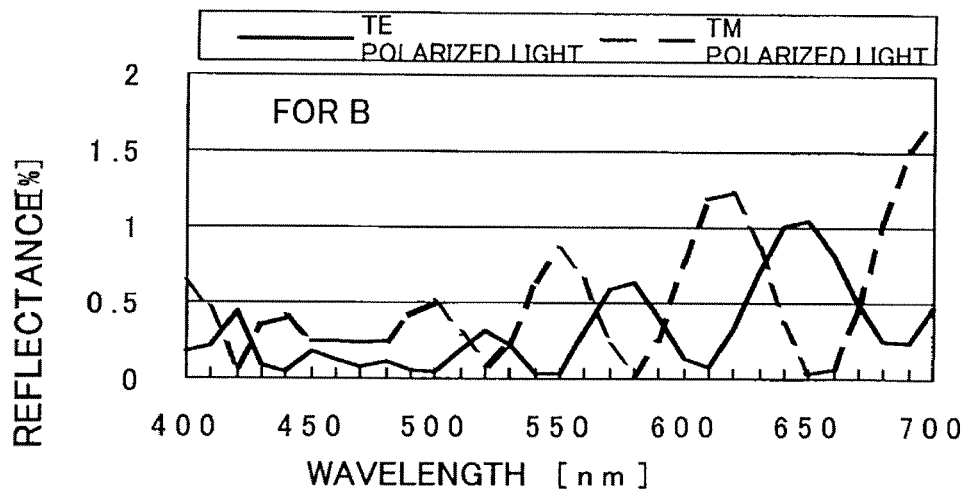
FIG. 5A is a graph showing a reflectance characteristic of the phase plate (quarter-wave plate for blue) of Embodiment 1.
Figure 5B:
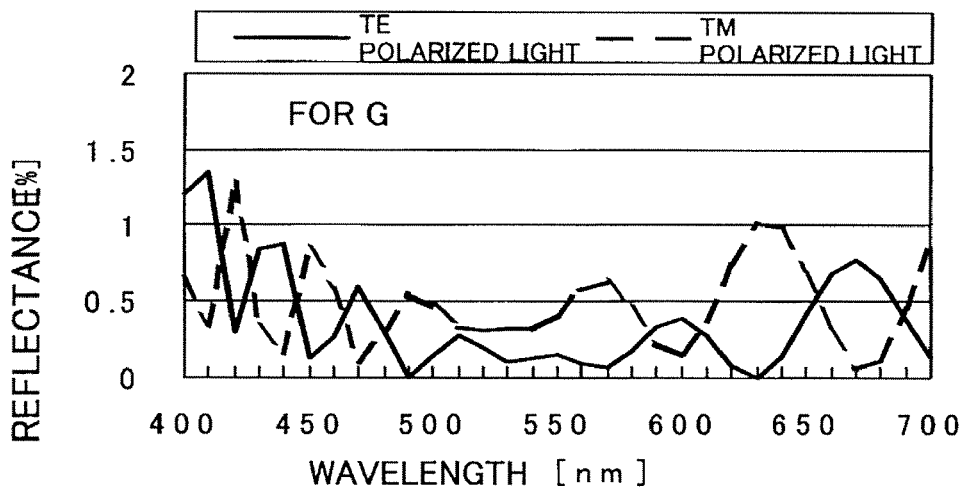
FIG. 5B is a graph showing a reflectance characteristic of the phase plate (quarter-wave plate for green) of Embodiment 1.
Figure 5C:
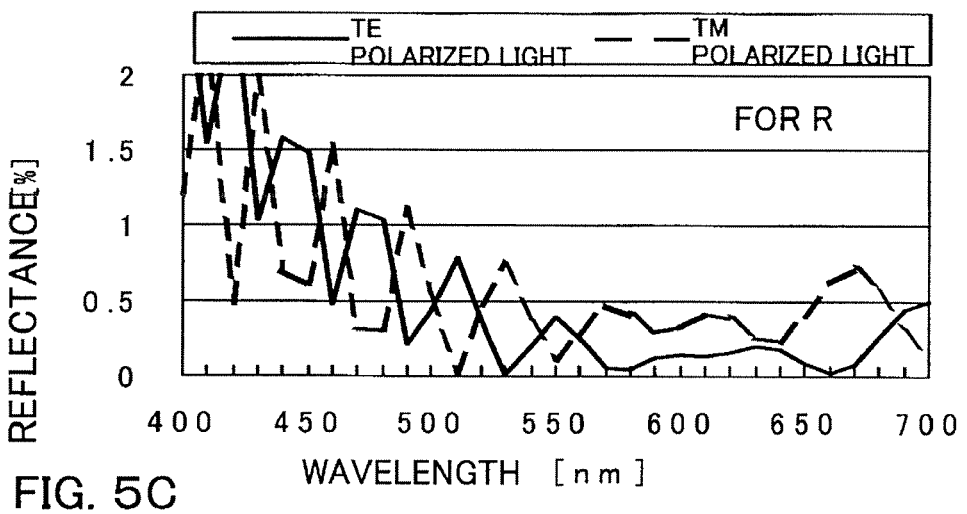
FIG. 5C is a graph showing a reflectance characteristic of the phase plate (quarter-wave plate for red) of Embodiment 1.

FIGS. 5A to 5C show a reflectance characteristic of the quarter-wave plate for each color of this embodiment. In these figures, the lateral axis shows wavelength and the vertical axis shows reflectance. FIG. 5A shows the reflectance characteristic of the quarter-wave plate for blue, FIG. 5B shows that for green, and FIG. 5C shows that for red. The two graphs of the solid line and the dashed line show the reflectance characteristics for two polarized lights (TE polarized light and TM polarized light) orthogonal to each other.

The reflectance of the quarter-wave plate for each color is suppressed to equal to or less than approximately 0.5% for both polarized lights in the wavelength band (use wavelength band) for each color to have a good transmittance characteristic (that is, a good reflection-suppressing characteristic).

In the actual use of the image projection apparatus, linearly-polarized light having a polarization direction intermediate between those of the TE polarized light and the TM polarized light enters into the quarter-wave plate for each color. The reflectance characteristic in this case is a characteristic near the average of those for two polarized lights in each figure.

Each of the characteristics shown in FIG. 4 and FIGS. 5A to 5C is the result of film design (simulation) based on a refractive index obtained by the effective medium theory described above. As the final process, it is desirable to accurately calculate the reflectance, the transmittance and the phase difference by vector analysis (rigorous coupled wave analysis: RCWA) from a viewpoint of wave optics in minute periodic structure. Even when the vector analysis is used, characteristics approximate to those shown in FIG. 4 and FIG. 5A to 5C are probably obtained.

Although this embodiment defined that the period P of the phase difference portion 5 is same as the periods Px and Py of the reflection-suppressing portion 6, alternative embodiments of the present invention are not limited thereto. Further, using materials other than those shown in FIGS. 3A to 3C also gives the similar effects to those described above.

Figure 19:
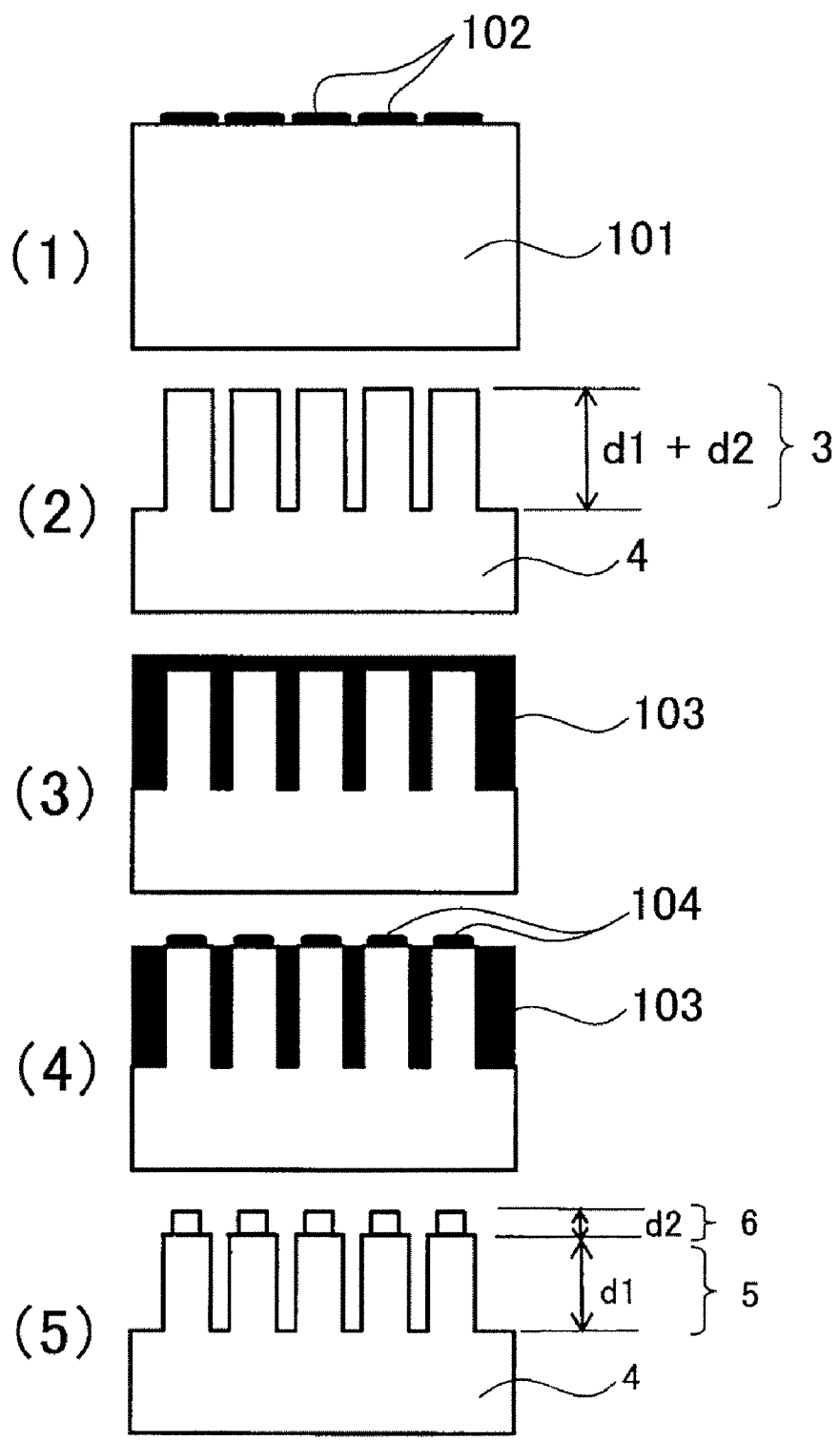
FIG. 19 is a pattern diagram illustrating the manufacturing process of the phase plate of Embodiment 1.

Referring to FIG. 19, a method of manufacturing the phase plate of this embodiment will be described. The method of manufacturing described herein uses a general lithography method. However, alternative embodiments of the present invention can employ other methods of manufacturing the phase plate (optical element).

A resist 102 is applied on areas corresponding to a grating pattern of the phase difference portion 5 on a top surface of a base plate 101.

Etching is performed to form a grating shape of the periodic structure 3 and the base portion 4. With the grating portion and the base portion etched, the height of the grating shape is d1+d2.

A resist 103 is applied by a spincoat method or the like to fill gaps between the gratings in the periodic structure 3.

A resist 104 is applied on areas corresponding to a grating pattern of the reflection-suppressing portion 6 on a top surface of the resist 103.

Finally, the grating shape (convex portion) of the reflection-suppressing portion 6 is formed by etching the upper part of the periodic structure 3 by the depth d2, and then the remaining resist is removed.

Performing these processes completes the phase plate of this embodiment.

Embodiment 2

Figure 6:
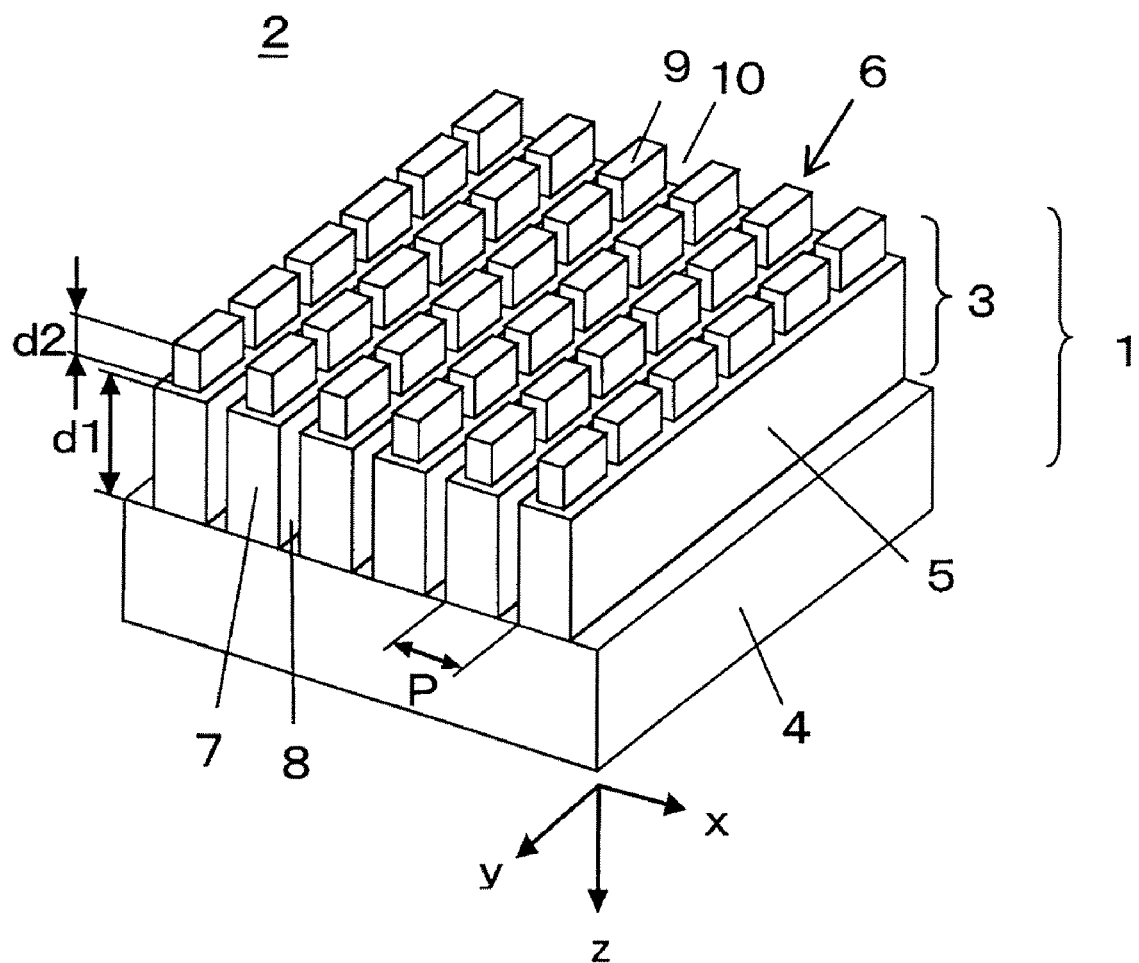
FIG. 6 is a perspective view of a phase plate that is a second embodiment (Embodiment 2) of the present invention.

FIG. 6 and FIGS. 7A to 7C show the structure of the phase plate (quarter-wave plate) that is a second embodiment (Embodiment 2) of the present invention. FIG. 6 is a perspective view of the phase plate. FIGS. 7A and 7B are x-z and y-z cross sectional views of the phase plate shown in FIG. 6. FIG. 7C is a top view of the phase plate.

The phase plate of this embodiment has basically the same structure as that of Embodiment 1, and portions common to those in Embodiment 1 are designated with the same reference numerals as those in Embodiment 1. The phase plate of this embodiment is different from that of Embodiment 1 in that the periodic structure 3 and the base portion 4 are formed of materials different from each other.

FIGS. 8A to 8C show design parameters of the quarter-wave plate of this embodiment for each color. The periodic structure 3 is formed of Al2O3 (refractive index n=1.65), and the base portion 4 is formed of glass (refractive index n=1.52).

Figure 9:
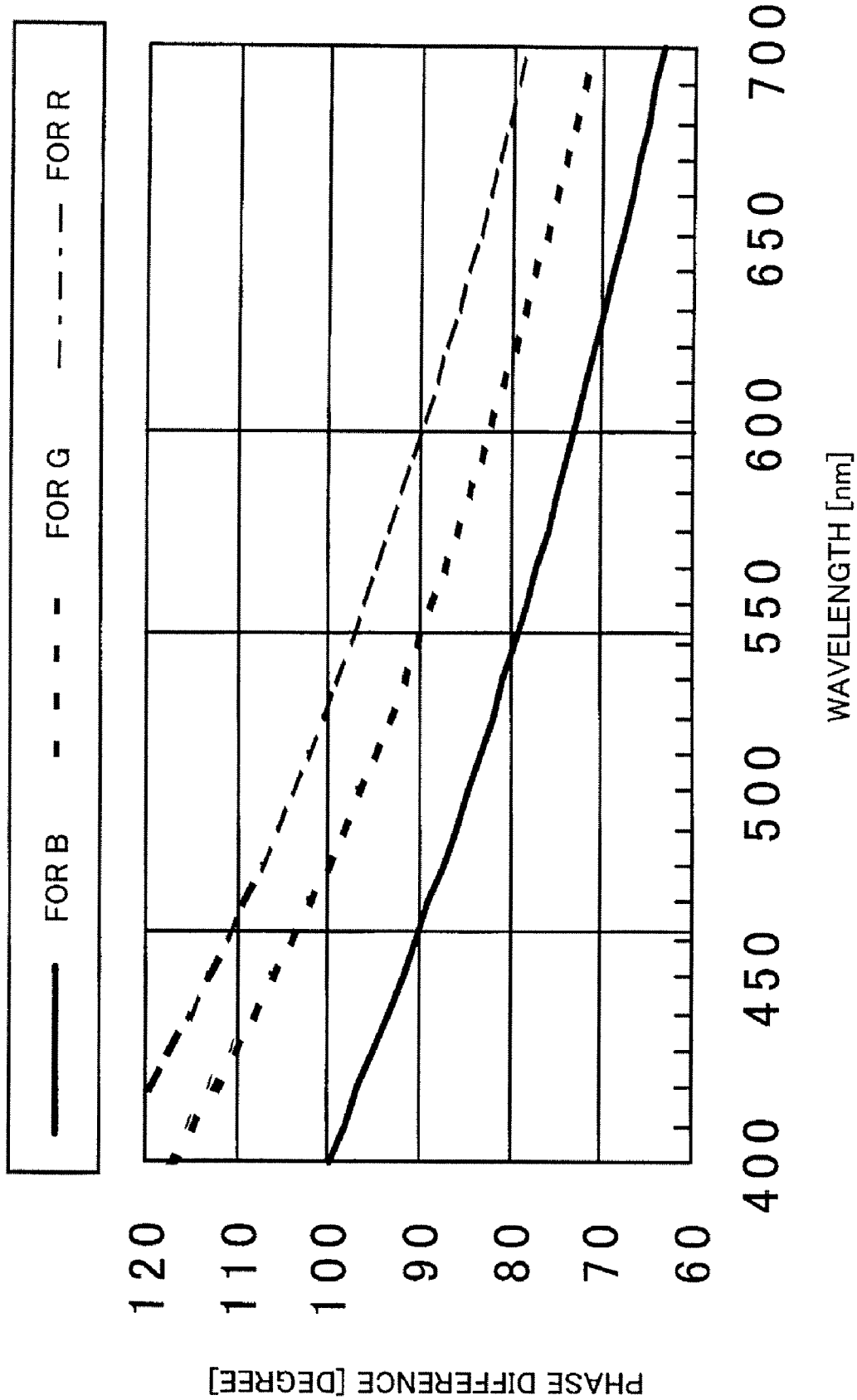
FIG. 9 is a graph showing a phase difference characteristic of the phase plate (quarter-wave plate for blue) of Embodiment 2.
Figure 10A:
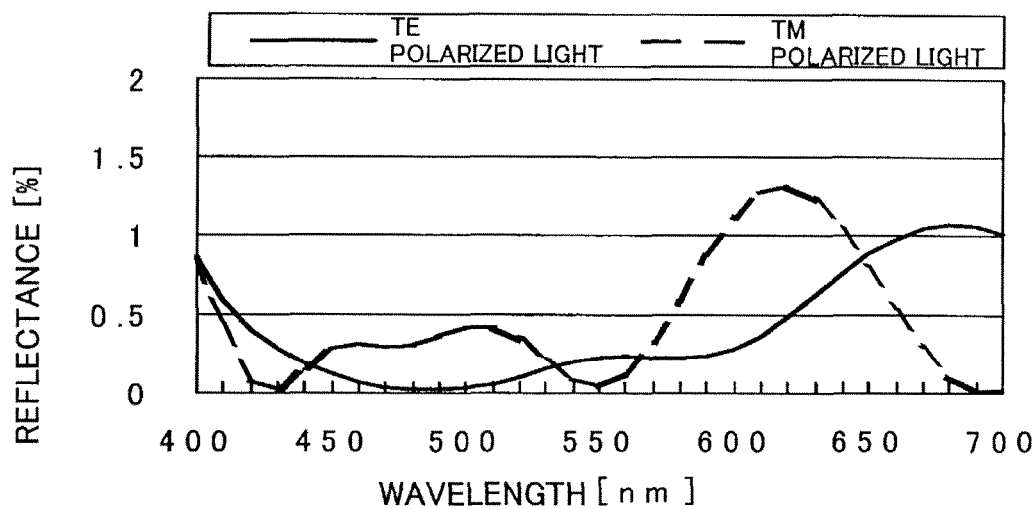
FIG. 10A is a graph showing a reflectance characteristic of the phase plate (quarter-wave plate for blue) of Embodiment 2.
Figure 10B:
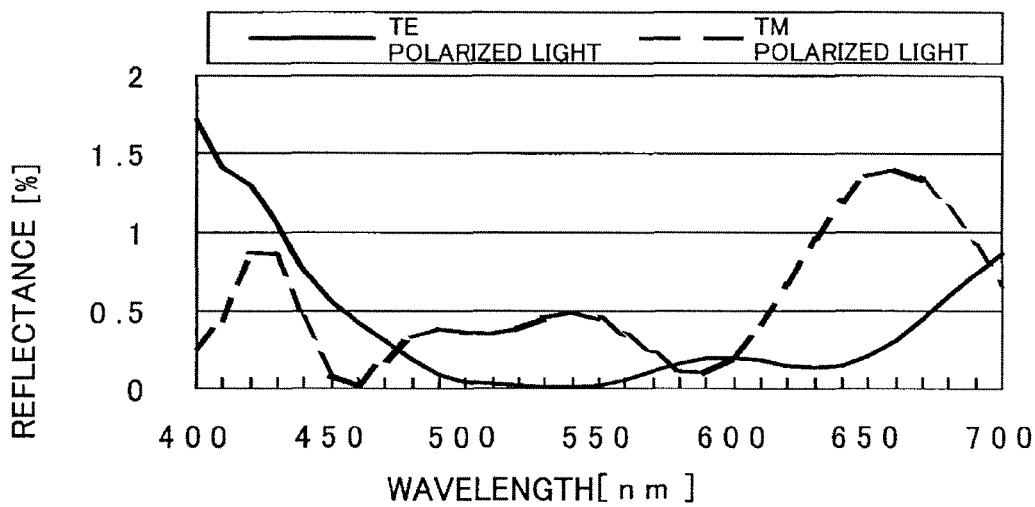
FIG. 10B is a graph showing a reflectance characteristic of the phase plate (quarter-wave plate for green) of Embodiment 2.
Figure 10C:
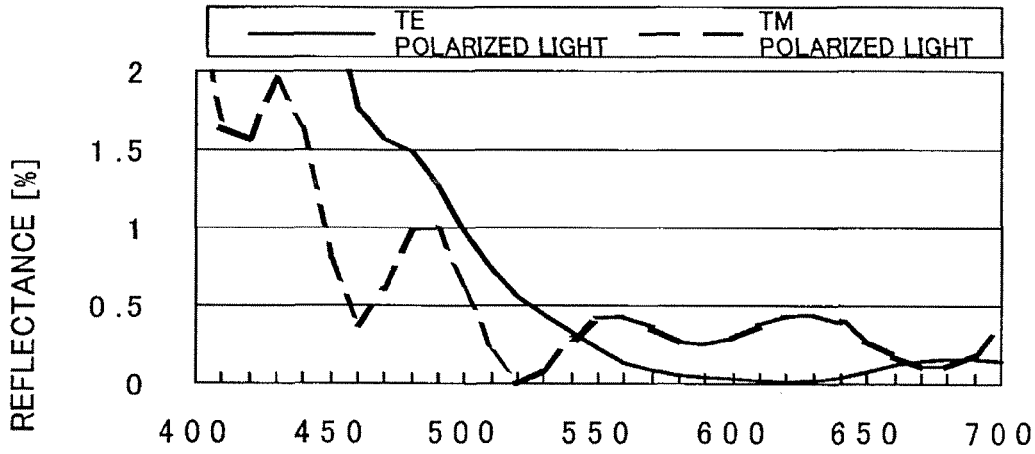
FIG. 10C is a graph showing a reflectance characteristic of the phase plate (quarter-wave plate for red) of Embodiment 2.

FIG. 9 shows a phase difference characteristic of the quarter-wave plate of this embodiment for each color, and FIGS. 10A to 10C show reflectance characteristics thereof.

As shown in FIG. 9, the phase difference characteristic is equivalent to that of the conventional and general quarter-wave plate shown in FIG. 21. FIGS. 10A to 10C show that the reflectance characteristic is equal to or less than 0.5% on average for the use wavelength band, which is a good transmittance characteristic (reflection-suppressing effect).

In this embodiment, Al2O3 having a higher refractive index than the material in Embodiment 1 is used for the first medium 7 and the third medium 9 in the periodic structure 3. Thus, the grating height of the quarter-wave plate for each color is about half of that in Embodiment 1, thereby making it possible to easily manufacture the grating.

Additionally, in this structure, it is preferable to set the refractive index of the first medium 7 constituting part of the phase difference portion 5 higher than that of the base portion 4. This makes it possible to decrease the difference between the effective refractive index of the phase difference portion 5 and the refractive index of the base portion 4, thus resulting in a reduction of reflection occurring on the interface between the base portion 4 and the phase difference portion 5.

Embodiment 3

A design example of the phase plate (quarter-wave plate) as a third embodiment (Embodiment 3) of the present invention will be described, which has an improved phase difference characteristic as compared to that in Embodiment 2.

Figure 12:
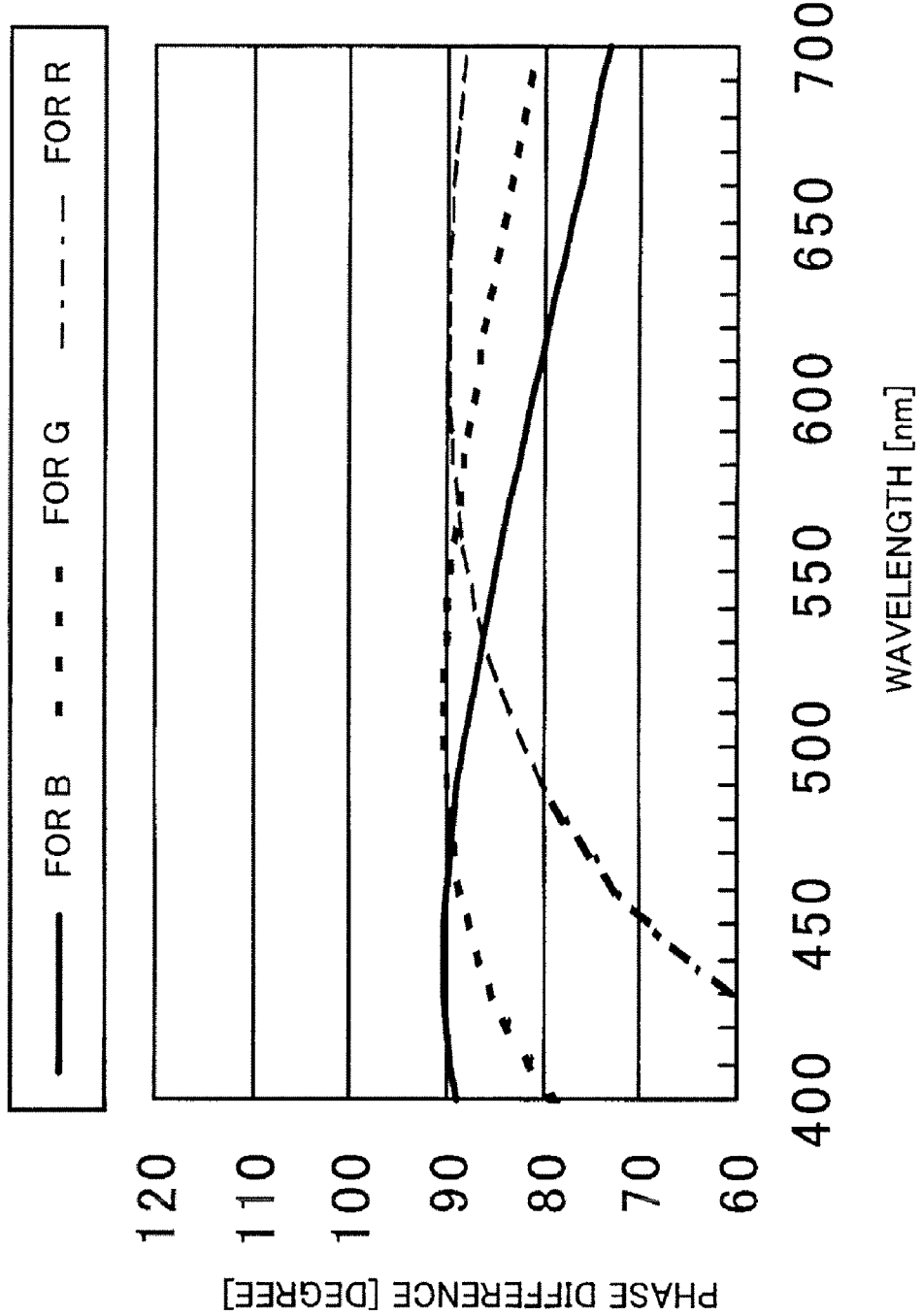
FIG. 12 is a graph showing a phase difference characteristic of the phase plate (quarter-wave plate for blue) of Embodiment 3.

FIGS. 11A to 11C show design parameters of the quarter-wave plate of this embodiment for each color. FIG. 12 shows a phase difference characteristic thereof, and FIGS. 13A to 13C show a reflectance characteristic thereof.

As shown in FIG. 12, the phase difference characteristic is drastically improved as compared to that of Embodiment 2 so that a phase difference deviation is suppressed to equal to or less than 5 degrees in the use wavelength band. This characteristic shows a high performance that cannot be realized by the conventional quarter-wave plate.

Figure 13A:
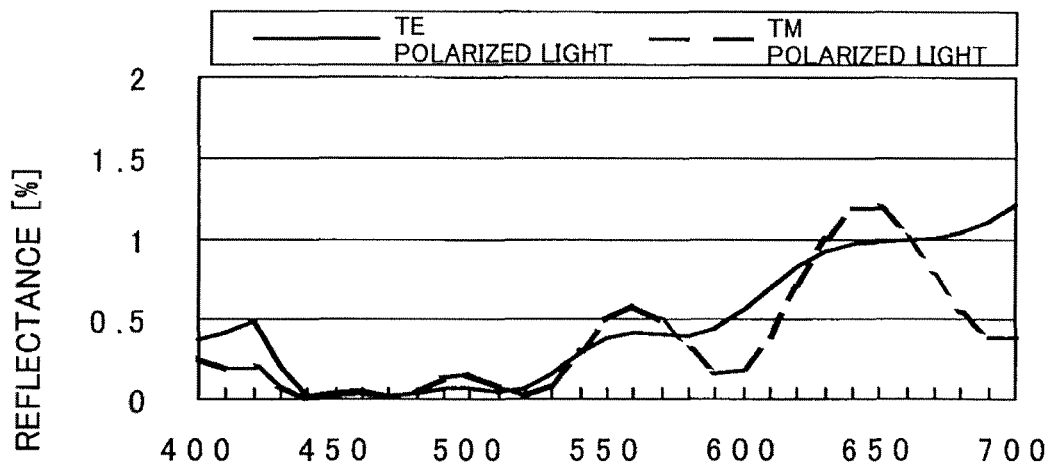
FIG. 13A is a graph showing a reflectance characteristic of the phase plate (quarter-wave plate for blue) of Embodiment 3.
Figure 13B:
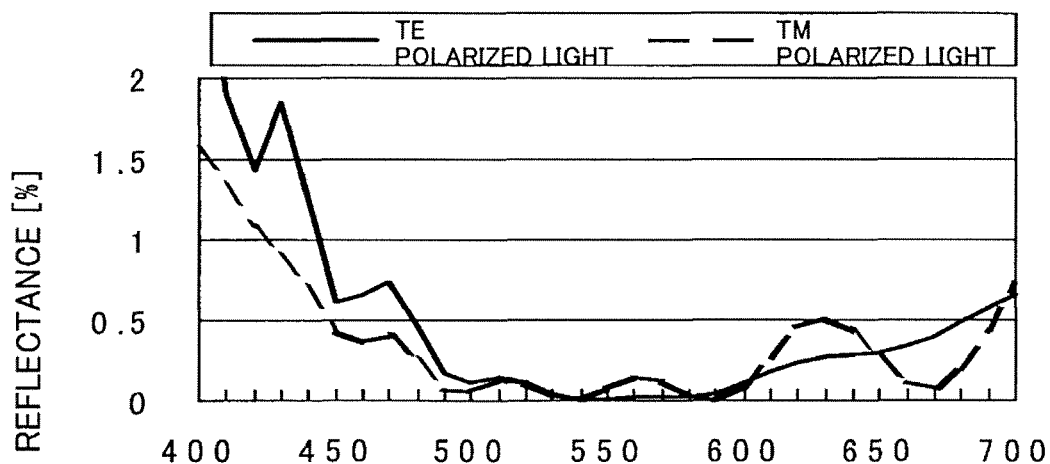
FIG. 13B is a graph showing a reflectance characteristic of the phase plate (quarter-wave plate for green) of Embodiment 3.
Figure 13C:
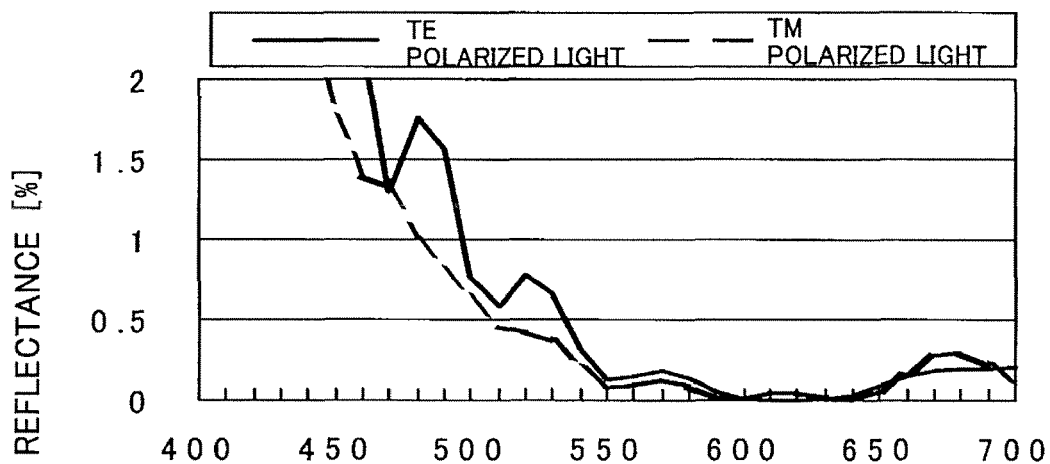
FIG. 13C is a graph showing a reflectance characteristic of the phase plate (quarter-wave plate for red) of Embodiment 3.

As shown in FIGS. 13A to 13C, the reflectance characteristic is suppressed to equal to or less than 0.2% on average in the use wavelength band so that a good transmittance characteristic (reflection-suppressing effect) can be obtained.

In this embodiment also, Al2O3 having a high refractive index is used for the first medium 7 and the third medium 9 in the periodic structure 3. However, the grating height of the periodic structure 3 in this embodiment is higher than that of Embodiment 2. If a high grating is readily manufactured, a quarter-wave plate can be provided in which the phase difference characteristic and the reflection-suppressing effect are superior to those of the conventional quarter-wave plate.

Embodiment 4

Figure 14:
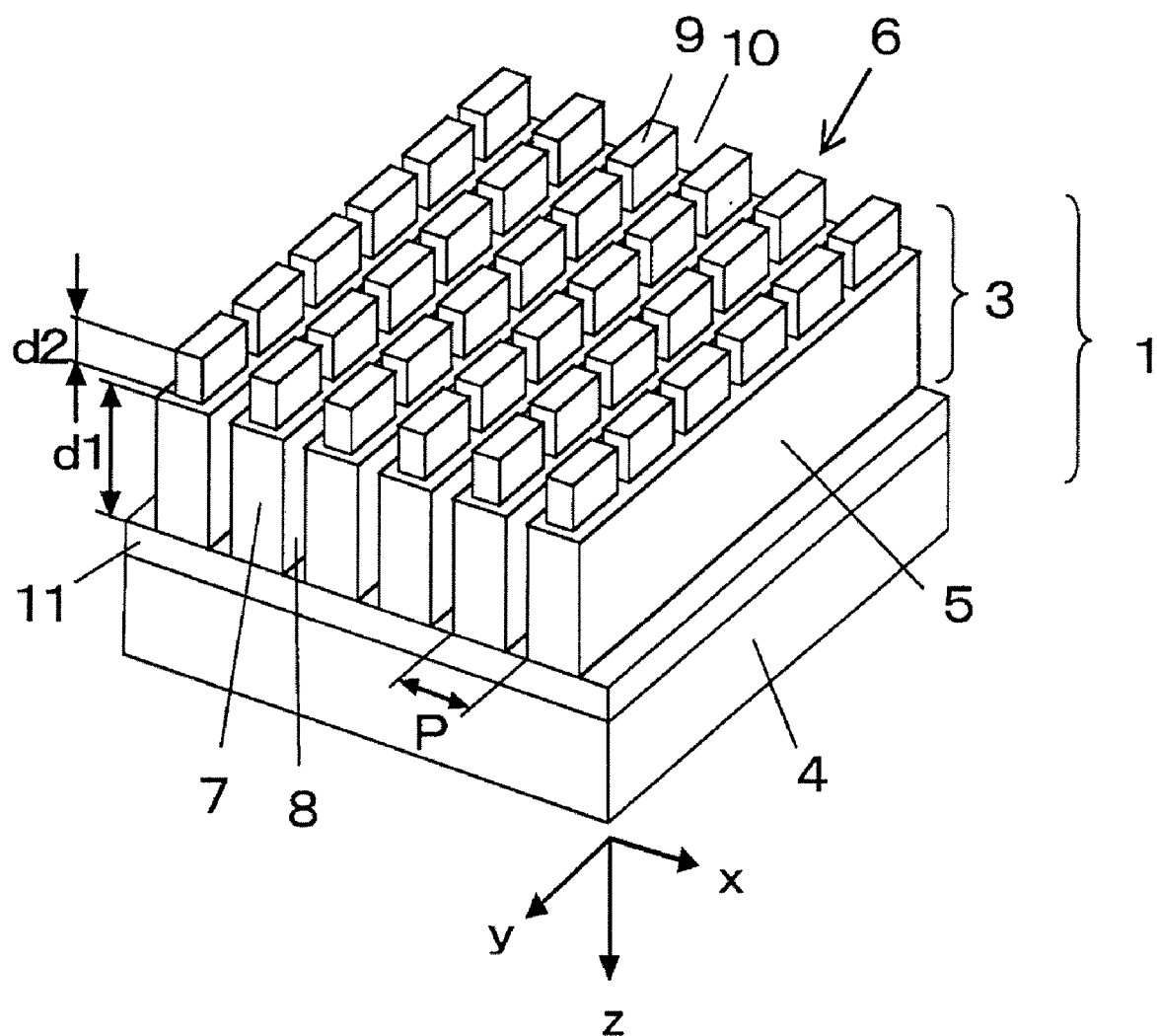
FIG. 14 is a perspective view of a phase plate that is a fourth embodiment (Embodiment 4) of the present invention.
Figure 15C:
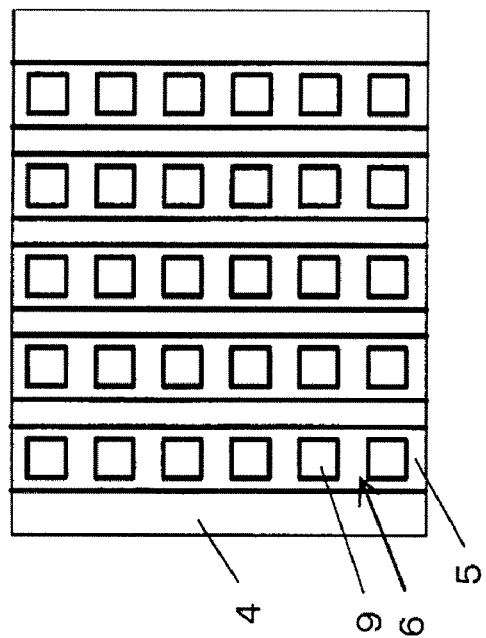
FIG. 15C is a top view of the phase plate shown in FIG. 14.
Figure 15A:
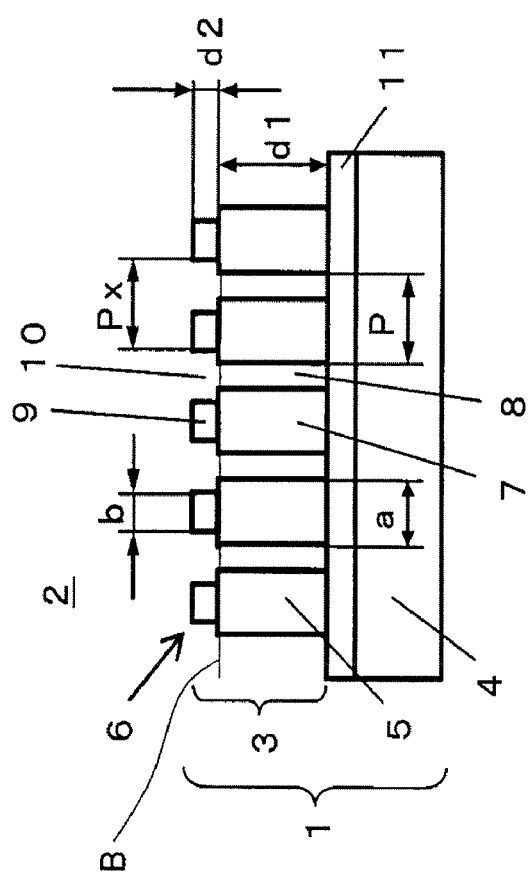
FIG. 15A is an x-y cross sectional view of the phase plate shown in FIG. 14.
Figure 15B:
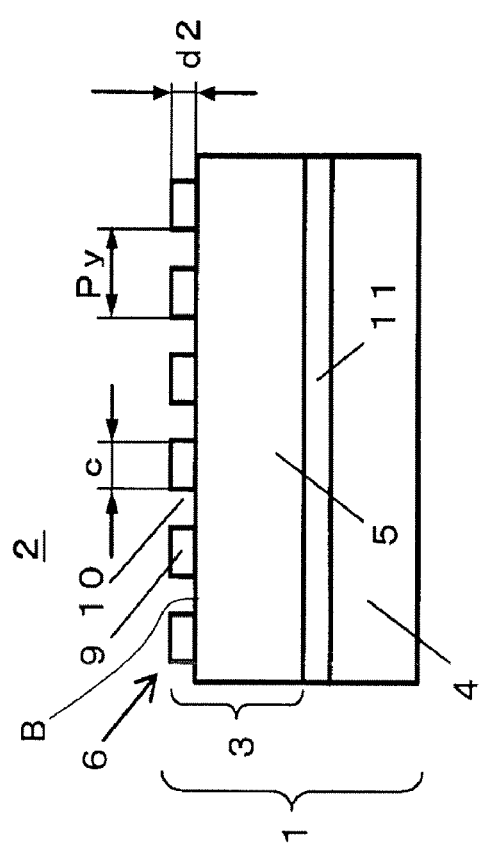
FIG. 15B is a y-z cross sectional view of the phase plate shown in FIG. 14.

FIG. 14 and FIGS. 15A to 15C show the structure of the phase plate (quarter-wave plate) that is a fourth embodiment of the present invention. FIG. 14 is a perspective view of the phase plate, FIGS. 15A and 15B are x-z and y-z cross sectional views of the phase plate. FIG. 15C is a top view of the phase plate.

The phase plate of this embodiment differs from that of Embodiment 1 in that the periodic structure 3 and the base portion 4 are formed of materials different from each other, and in that a homogeneous layer 11 is provided at the interface between the periodic structure 3 and the base portion 4.

FIGS. 16A to 16C show design parameters of the quarter-wave plate of this embodiment for each color. The periodic structure portion 3 is formed of Al2O3, and the base portion 4 is formed of glass. In column s5, the material (SiO2) of the homogeneous layer 11 and its thickness are shown.

Figure 17:
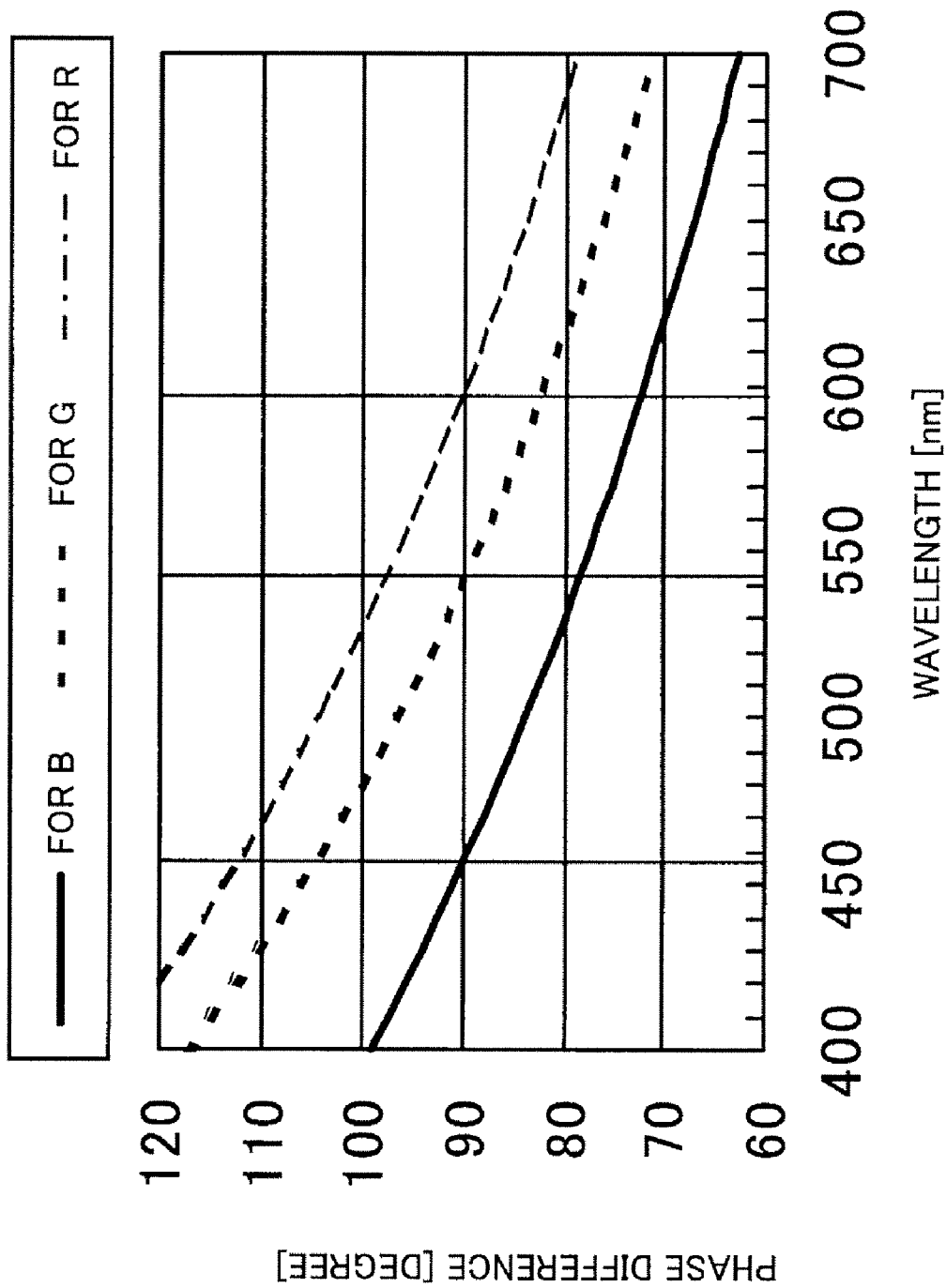
FIG. 17 is a graph showing a phase difference characteristic of the phase plate (quarter-wave plate for blue) of Embodiment 4.
Figure 18A:
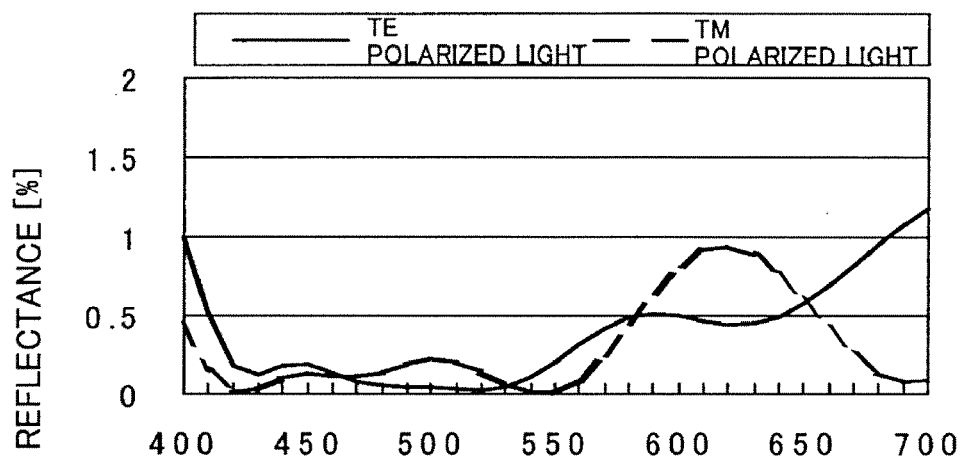
FIG. 18A is a graph showing a reflectance characteristic of the phase plate (quarter-wave plate for blue) of Embodiment 4.
Figure 18B:
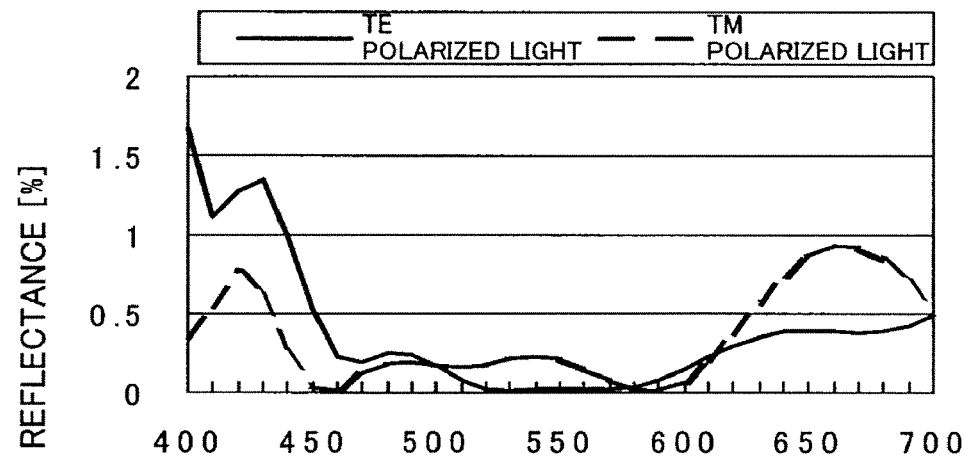
FIG. 18B is a graph showing a reflectance characteristic of the phase plate (quarter-wave plate for green) of Embodiment 4.
Figure 18C:
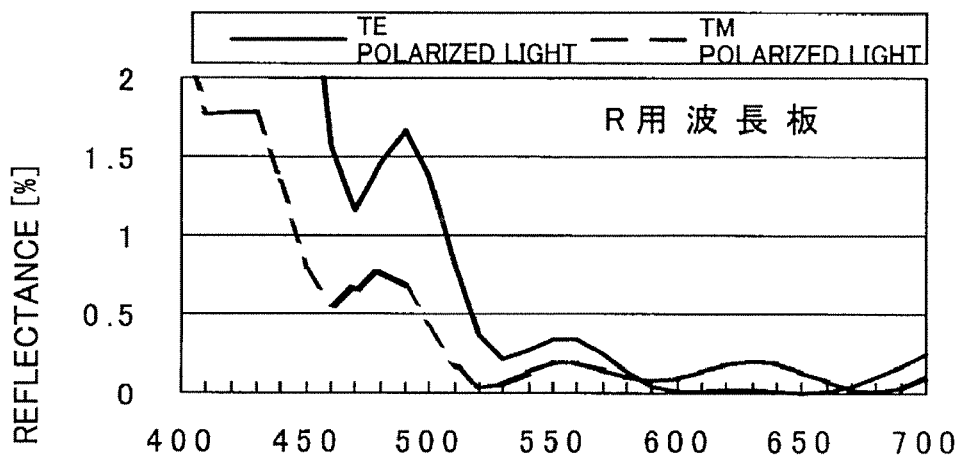
FIG. 18C is a graph showing a reflectance characteristic of the phase plate (quarter-wave plate for red) of Embodiment 4.

FIG. 17 shows a phase difference characteristic of the quarter-wave plate of this embodiment for each color, and FIGS. 18A to 18C show a reflection characteristic thereof.

As shown in FIG. 17, the phase difference characteristic is equivalent to that of the conventional and general quarter-wave plate shown in FIG. 21. FIGS. 18A to 18C show that the reflection characteristic is equal to or less than 0.3% on average in the use wavelength band, which is a good transmittance characteristic (reflection-suppressing effect).

It is preferable to select the material and the thickness of the homogeneous layer 11 so as to obtain a reflection-suppressing effect. Selecting the material of the homogeneous layer 11 that can serve (function) as an etching stopper layer for forming the phase difference portion 5 by etching can improve manufacturing accuracy of the phase difference portion 5 in the direction of height, thereby resulting in a simpler manufacturing method of the phase plate.

Embodiment 5

Figure 22:
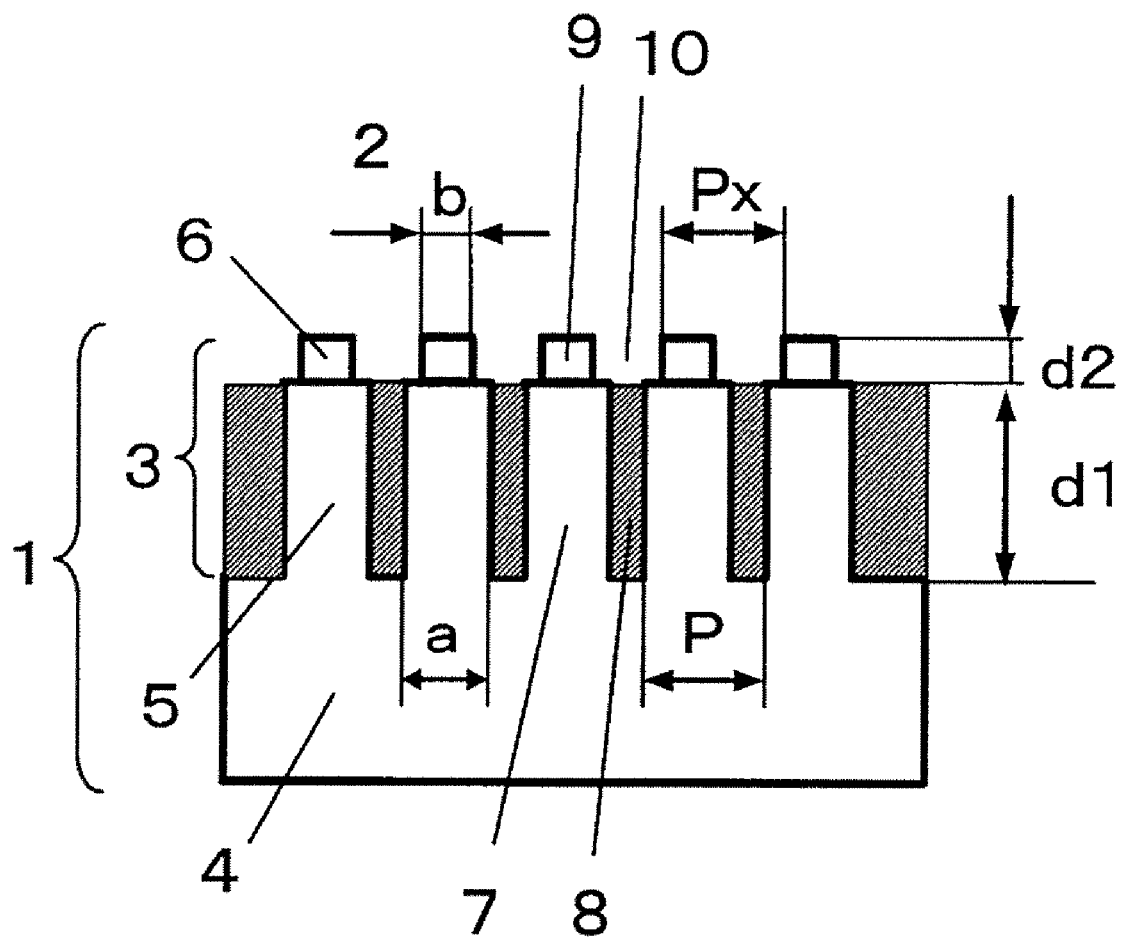
FIG. 22 is a cross sectional view of a phase plate that is a fifth embodiment (Embodiment 5) of the present invention.

FIG. 22 shows a cross section (corresponding to the x-z cross section in other embodiments) of a phase plate (quarter-wave plate) that is a fifth embodiment (Embodiment 5).

In each embodiment described above, air is used for the second medium 8 of the phase difference portion 5 and the fourth medium 10 of the reflection-suppressing portion 6. In this embodiment, however, a material other than air is used to form the second medium 8. SiO2 can be used as the material other than air, for example, when Al2O3 is used as the first medium 7.

Even when the material other than air is used for the second material 8, a good phase difference characteristic and a good transmittance characteristic can be obtained as well as in each embodiment described above.

Since the reflection-suppressing portion 6 is formed on the phase difference portion 5 as described in each embodiment, the phase plate has a good phase difference characteristic and a good transmittance characteristic.

Further, since the reflection-suppressing portion 6 has a simple structure in which the convex portion 9 is formed at the interface opposite to the base portion 4 in the phase difference portion 5, a good reflection-suppressing effect can be readily obtained for each polarization direction of the incident light.

Furthermore, the convex portion 9 is provided only at the interface of the first media 7 having a higher refractive index out of the media of the phase difference portion 5, the convex portion 9 can be formed by repeating a process including resist application and etching.

Each embodiment described above employs an inorganic material such as SiO2 and Al2O3 as the material of the periodic structure portion 3. Thus, a quarter-wave plate can be realized which has a heat-resistance superior to that of conventional quarter-wave plates formed of an organic film.

As described above, the first periodic structure portion in the optical element in each embodiment has the form birefringence effect (for example, the effect as the phase plate), and the second periodic structure portion has the reflection-suppressing effect. Thus, the optical element can be realized which has a good form birefringence effect and a higher transmittance characteristic than that of conventional ones.

Employing the optical element realizes an image projection apparatus forming an image with a good quality.

Although the description was made of the case where the convex portion 9 (third medium 9) of the reflection-suppressing portion 6 is formed in a rectangular grating shape in the above embodiments, the convex portion 9 may be formed in other shapes than the rectangular shape, such as a square pole, a cylinder, a circular cone, a square pyramid and a trapezoid pyramid.

The description was made of the quarter-wave plate in the above embodiment. However, alternative embodiments of the present invention include other phase plates such as a half-wave plate, and optical elements having optical effects on polarized light other than the phase plate. Furthermore, an optical element of embodiments of the present invention can be used in optical apparatuses forming an image via the optical element, which is other than the image projection apparatus.

Furthermore, the present invention is not limited to these embodiments and various variations and modifications may be made without departing from the scope of the present invention.

This application claims foreign priority benefits based on Japanese Patent Application No. 2006-328865, filed on Dec. 5, 2006 each of which is hereby incorporated by reference herein in its entirety as if fully set forth herein.

What is claimed is:

1. An optical element comprising:
a base portion having translucency;
a first periodic structure portion being formed on the base portion and having a one-dimensional periodic structure in which a first medium and a second medium with a smaller refractive index than that of the first medium are alternately disposed in a first direction at a smaller period than a wavelength of incident light; and
a second periodic structure portion being formed on the first periodic structure portion on an opposite side to the base portion and having a periodic structure in which a third medium and a fourth medium with a smaller refractive index than that of the third medium are alternately disposed in the first direction at a smaller period than the wavelength of the incident light,
wherein the optical element functions as a phase plate,
wherein, at an interface between the first periodic structure portion and the second periodic structure portion, a proportion of the first medium to the first periodic structure portion in the first direction and a proportion of the third medium to the second periodic structure portion in the first direction are different from each other, and
wherein the second periodic structure portion has a two-dimensional periodic structure in which the third medium and the fourth medium are periodically disposed in the first direction and a direction different from the first direction.

2. An optical element according to claim 1, wherein the third medium is formed of the same material as that of the first medium.

3. An optical element according to claim 1, wherein the following expression is satisfied:

$$0.6 \leq a/P \leq 0.85$$

where a represents a width of the first medium in the first periodic structure portion in the first direction and P represents a period of the first medium.

4. An optical element according to claim 1, wherein the base portion has a smaller refractive index than that of the first medium.

5. An optical element according to claim 1, wherein at least one layer having a reflection-suppressing effect is provided between the base portion and the first periodic structure portion.

6. An optical element according to claim 5, wherein, of the at least one layer having the reflection-suppressing effect, a layer closest to the first periodic structure portion is an etching stopper layer.

7. An optical element according to claim 1, wherein the refractive index of the first medium is equal to or smaller than 1.8.

8. An optical element according to claim 1, wherein the first periodic structure portion has a form birefringence effect on the incident light, and
wherein the second periodic structure portion has a reflection-suppressing effect on the incident light.

9. An optical apparatus comprising an optical element according to claim 1, wherein the optical apparatus forms an image using light from the optical element.

10. An image projection apparatus comprising: a light-modulating element modulating light from a light source; a projection optical system projecting light modulated by the light-modulating element; and an optical element as a phase plate according to claim 1 through which the light entering into and emerging from the light-modulating element passes.

* * * * *